(12) United States Patent
Hu

(10) Patent No.: US 12,444,986 B1
(45) Date of Patent: Oct. 14, 2025

(54) WIRELESS POWER TRANSFER SYSTEM FOR ZERO CURRENT SWITCHING OPERATION UNDER CHARGE-BLOCK OSCILLATION

(71) Applicant: NINGBO DOUCHPOWER TECHNOLOGY CO., LTD., Zhejiang (CN)

(72) Inventor: Jianghao Hu, Ningbo (CN)

(73) Assignee: NINGBO DOUCHPOWER TECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 19/251,768

(22) Filed: Jun. 26, 2025

Related U.S. Application Data

(63) Continuation of application No. PCT/CN2023/130332, filed on Nov. 8, 2023.

(30) Foreign Application Priority Data

Oct. 31, 2023 (CN) .......................... 202311443906.6

(51) Int. Cl.
*H02J 50/12* (2016.01)
(52) U.S. Cl.
CPC ..................... *H02J 50/12* (2016.02)
(58) Field of Classification Search
CPC .......... H02J 50/12; H02M 3/338; H02M 1/32; H02M 1/00
See application file for complete search history.

(56) References Cited

U.S. PATENT DOCUMENTS

| 4,443,839 A | 4/1984 | Onodera et al. |
| 9,368,274 B2 * | 6/2016 | Xu .......................... H02J 50/402 |

(Continued)

FOREIGN PATENT DOCUMENTS

| CN | 103023158 A | 4/2013 |
| CN | 203151192 U | 8/2013 |

(Continued)

OTHER PUBLICATIONS

First Office Action in Chinese Application No. 202311443906.6 mailed on Oct. 13, 2024, 18 pages.

(Continued)

*Primary Examiner* — Rexford N Barnie
*Assistant Examiner* — Michael J Warmflash
(74) *Attorney, Agent, or Firm* — PORUS IP LLC

(57) ABSTRACT

The present disclosure relates to a field of wireless power transfer technology. The present disclosure relates to a wireless power transfer system for zero current switching (ZCS) operation under charge-blocking oscillation, comprising a power supply, a transmitter terminal, and a receiver terminal, the transmitter terminal having a resonance capacitor and a transmitter coil, the receiver terminal having a receiver coil. The transmitter terminal further comprises: an equivalent resistor, the equivalent resistor being connected in series with the transmitter coil and then in parallel with the resonance capacitor to form a charge-blocking oscillation circuit; a control switch, the control switch being connected with both terminals of the power supply after being connected in series with the charge-blocking oscillation circuit A self-oscillating is achieved by utilizing charge-blocking. By blocking the resonant cavity after charging, an energy is closed inside the closed-loop resonance circuit, and the energy will oscillate. Compared with a conventional self-oscillating wireless power transfer (WPT) based on a (Continued)

negative resistor, some improvements in the present disclosure have a fewer count of switching devices and do not require any additional circuit design, thus having a better cost and robustness.

10 Claims, 15 Drawing Sheets

(56) References Cited

U.S. PATENT DOCUMENTS

| | | | | |
|---|---|---|---|---|
| 10,027,377 | B2* | 7/2018 | Hosotani | H04B 5/26 |
| 10,374,460 | B2* | 8/2019 | Oshima | H02J 50/005 |
| 11,146,112 | B1* | 10/2021 | Luo | H02M 7/5387 |
| 11,201,562 | B1* | 12/2021 | Wasynczuk | H02M 7/4811 |
| 2012/0313444 | A1* | 12/2012 | Boys | H02J 50/12 |
| | | | | 307/104 |
| 2013/0069442 | A1* | 3/2013 | Kim | H02J 50/50 |
| | | | | 307/104 |
| 2015/0194811 | A1* | 7/2015 | Mao | H02M 3/33523 |
| | | | | 307/104 |
| 2015/0255988 | A1* | 9/2015 | Yang | H02J 50/40 |
| | | | | 307/104 |
| 2019/0157914 | A1* | 5/2019 | Watanabe | H02J 50/12 |
| 2020/0169123 | A1* | 5/2020 | Mehas | H02J 50/60 |
| 2020/0328626 | A1* | 10/2020 | Maniktala | H02J 50/10 |
| 2021/0152033 | A1* | 5/2021 | Nagai | H02J 50/12 |
| 2021/0384768 | A1* | 12/2021 | Goodchild | H01F 38/14 |
| 2022/0052561 | A1* | 2/2022 | Goodchild | H02J 50/402 |
| 2022/0320908 | A1* | 10/2022 | Yoon | H02J 50/12 |
| 2023/0352985 | A1* | 11/2023 | Kimura | H02J 50/402 |
| 2023/0369896 | A1* | 11/2023 | Suarez Sandoval | H02J 50/005 |
| 2024/0120775 | A1* | 4/2024 | Ishida | H02J 7/02 |
| 2024/0195226 | A1* | 6/2024 | Ahn | H02J 50/70 |

FOREIGN PATENT DOCUMENTS

| | | |
|---|---|---|
| CN | 104638774 A | 5/2015 |
| CN | 104659929 A | 5/2015 |
| CN | 108565989 A | 9/2018 |
| CN | 111464063 A | 7/2020 |
| CN | 112531922 A | 3/2021 |
| CN | 114204697 A | 3/2022 |
| CN | 116826992 A | 9/2023 |
| JP | 2001178124 A | 6/2001 |
| KR | 101374525 B1 | 3/2014 |
| KR | 101514803 B1 | 4/2015 |
| WO | 2022171269 A1 | 8/2022 |

OTHER PUBLICATIONS

Decision to Grant a Patent in Chinese Application No. 202311443906.6 mailed on Jan. 16, 2025, 4 pages.

International Search Report in PCT/CN2023/130332 mailed on Jun. 24, 2024, 6 pages.

Written Opinion in PCT/CN2023/130332 mailed on Jun. 24, 2024, 5 pages.

Zhang, Hao et al., Wireless Power Transfer Antenna Alignment Using Intermodulation for Two-Tone Powered Implantable Medical Devices, IEEE Transactions on Microwave Theory and Techniques, 67(5): 1708-1716, 2019.

Hu, Jianghao et al., A Real-Time Maximum Efficiency Tracking for Wireless Power Transfer Systems Based on Harmonic-Informatization, IEEE Transactions on Power Electronics, 38(1): 1275-1287, 2023.

Hu, Jianghao et al., A General Method for Estimating Coupling Coefficients in Multicoil Wireless Power Transfer Based on Harmonic Informatization, IEEE Transactions on Transportation Electrification, 9(3): 4170-4182, 2023.

Hu, Jianghao et al., Design of Wireless Power Transfer System with Input Filter, IET Power Electronics, 13(7): 1393-1402, 2020.

Liu, Shangjiang et al., Study on Frequency Tracking for Wireless Power Transfer System Using Magnetic Resonant Coupling, 2018 13th IEEE Conference on Industrial Electronics and Applications (ICIEA), 2569-2572, 2018.

Xie, Kai et al., Half-Cycle Resonance Tracking for Inductively Coupled Wireless Power Transmission System, IEEE Transactions on Power Electronics, 33(3): 2668-2679, 2018.

Nam Yoon Kim et al., Automated Adaptive Frequency Tracking System for Efficient Mid-Range Wireless Power Transfer via Magnetic Resonanc Coupling, Proceedings of the 42nd European Microwave Conference, 221-224, 2012.

Alanson P. Sample et al., Analysis, Experimental Results, and Range Adaptation of Magnetically Coupled Resonators for Wireless Power Transfer, IEEE Transactions on Industrial Electronics, 58(2): 544-554, 2011.

Hu, Jianghao et al., A Wide Charging Range Wireless Power Transfer Control System With Harmonic Current to Estimate the Coupling Coefficient, IEEE Transactions on Power Electronics, 36(5): 5082-5094, 2021.

Jungsik Kim et al., Range-Adaptive Wireless Power Transfer Using Multiloop and Tunable Matching Techniques, IEEE Transactions on Industrial Electronics, 62(10): 6233-6241, 2015.

Li, Weihan et al., A Double-Side Self-Tuning LCC/S System Using a Variable Switched Capacitor Based on Parameter Recognition, IEEE Transactions on Industrial Electronics, 68(4): 3069-3078, 2021.

SID Assawaworrarit et al., Robust Wireless Power Transfer Using a Nonlinear Parity-Time-Symmetric Circuit, Nature, 387-390, 2017.

SID Assawaworrarit et al., Robust and Efficient Wireless Power Transfer Using a Switch-Mode Implementation of a Nonlinear Parity-Time Symmetric Circuit, Nature Electronics, 273-279, 2020.

Feng, Guangyin et al., An Injection-Locked Wireless Power Transfer Transmitter With Automatic Maximum Efficiency Tracking, IEEE Transactions on Industrial Electronics, 68(7): 5733-5743, 2021.

Sergei Tretyakov et al., On Self-Oscillating Wireless Power Transfer, 2017 IEEE International Conference on Microwaves, Antennas, Communications and Electronic Systems (COMCAS), 2017, 3 pages.

Zhou, Jiali et al., Nonlinear Parity-Time-Symmetric Model for Constant Efficiency Wireless Power Transfer: Application to a Drone-in-Flight Wireless Charging Platform, IEEE Transactions on Industrial Electronics, 66(5): 4097-4107, 2019.

Wu, Lihao et al., A Robust Parity-Time-Symmetric WPT System With Extended Constant-Power Range for Cordless Kitchen Appliances, IEEE Transactions on Industry Applications, 58(1): 1179-1189, 2022.

Wu, Lihao et al., Efficiency Improvement of the Parity-Time-Symmetric Wireless Power Transfer System for Electric Vehicle Charging, IEEE Transactions on Power Electronics, 35(11): 12497-12508, 2020.

Ye Zhilu et al., Multi-Band Parity-Time-Symmetric Wireless Power Transfer Systems for ISM-Band Bio-Implantable Applications, IEEE Journal of Electromagnetics, RF, and Microwaves in Medicine and Biology, 6(2): 196-203, 2022.

Wang, Qiangniu et al., Exact Analysis of Frequency Splitting Phenomena of Contactless Power Transfer Systems, IEEE Transactions on Circuits and Systems-I: Regular Papers, 60(6): 1670-1677, 2013.

* cited by examiner

WIRELESS POWER TRANSFER SYSTEM FOR ZERO CURRENT SWITCHING OPERATION UNDER CHARGE-BLOCK OSCILLATION

CROSS-REFERENCE TO RELATED APPLICATIONS

This application is a Continuation of International Application No. PCT/CN2023/130332, filed on Nov. 8, 2023, which claims priority to Chinese Patent Application No. 202311443906.6, filed on Oct. 31, 2023, the entire contents of which are hereby incorporated by reference.

TECHNICAL FIELD

The present disclosure relates to a technology field of wireless power transfer, and specifically relates to a wireless power transfer system for zero current switching (ZCS) operation under charge-blocking oscillation.

BACKGROUND

As a safe, convenient, and efficient energy transmission manner, a wireless power transfer (WPT) technology has been developed for a long time, which has attracted the attention of industry personnel and has been widely used in medical, automotive, unmanned aerial vehicle, mobile phone, and other fields.

An accurate matching between an operating frequency of the WPT and a natural resonance frequency of a circuit is a premise of the efficient energy transmission of the system. However, due to the influence of temperature, device tolerance, charging distance, and other factors, the resonance frequency may shift, which makes an operating state of the system worse. Thus, how to make the operating frequency track the resonance frequency is a key point of a research focus in the WPT.

The operating frequency of the conventional WPT is determined by an external drive signal of inverters. Since the resonance state of WPT is variable and difficult to detect or control, the conventional manner requires a large count of auxiliary circuits and measurement controls to achieve the tracking operation of the resonance frequency, resulting in a bottleneck of the resonance frequency tracking in control accuracy, real-time, and robustness.

The resonance is a physical phenomenon that can occur not only by an external driving but also by self-oscillating. As an energy transmission process of the WPT, the resonance may transmit the energy through the self-oscillating. The operating frequency of the self-oscillating WPT is determined by a resonance parameter and is approximately equal to the natural resonance frequency, which makes the self-oscillating WPT greatly improve the bottleneck of the conventional WPT in the resonance frequency tracking operation.

SUMMARY

The present disclosure aims at technical problems that the conventional manner requires a large count of auxiliary circuits and measurement and control in the realization of resonance tracking, which may not only increase the cost but also reduce the real-time and robustness. The purpose is to provide a wireless power transfer system for zero current switching (ZCS) operation under charge-blocking oscillation.

In order to solve the aforementioned technical problems, embodiments of the present disclosure provide the wireless power transfer system for zero current switching (ZCS) operation under charge-blocking oscillation, comprising a power supply, a transmitter terminal and a receiver terminal, the transmitter terminal has a resonance capacitor and a transmitter coil, the receiver terminal has a receiver coil, the receiver coil is coupled with the transmitter coil to produce a magnetic field coupling; wherein the transmitter terminal further comprises: an equivalent resistor, the equivalent resistor being connected in series with the transmitter coil and then in parallel with the resonance capacitor to form a charge-blocking oscillation circuit; a control switch, the control switch being connected with both terminals of the power supply after being connected in series with the charge-blocking oscillation circuit, and the control switch being provided between a positive pole of the power supply and the charge-blocking oscillation circuit; a side of the transmitter coil close to the control switch having a first voltage detection terminal, and a second voltage detection terminal being provided between the control switch and the power supply; in response to determining that a voltage of the first voltage detection terminal reaches a predetermined maximum value, conducting the control switch; and in response to determining that an energy of the second voltage detection terminal reaches a predetermined minimum value, disconnecting the control switch.

BRIEF DESCRIPTION OF THE DRAWINGS

These exemplary embodiments are described in detail with reference to the drawings. These embodiments are non-limiting exemplary embodiments, in which the same reference numerals represent the same structures, wherein.

DETAILED DESCRIPTION

The following specific examples are given to illustrate the embodiments of the present disclosure, and technicians in this field may easily understand the other advantages and efficacy of the present disclosure from the content revealed in the present disclosure. The present disclosure may be implemented or applied in various other specific embodiments, and various details in the present disclosure may be modified or altered based on different views and applications without departing from the spirit of the present disclosure.

It is to be noted that the following embodiments and features in the embodiments may be combined with each other without conflict.

In the description of the present disclosure, it should be noted that, with regard to the words of orientation, such as the terms "outer," "middle," "inner," and "outer", indicating an orientation or positional relationship based on that shown in the accompanying drawings, they are used only for the convenience of recounting the present disclosure and simplifying the description, and not to indicate or imply that the device or element referred to must have a specific orientation, be constructed and operated in a specific orientation, and is not to be construed as limiting the specific scope of protection of the present disclosure.

Additionally, the terms "first" and "second", if any, are used only for descriptive purposes and are not to be construed as indicating or implying relative importance or implicitly specifying a number of technical features. Thus, the limitation that there are "first" and "second" features may expressly or impliedly include one or more of those features, and in the present disclosure, "a plurality of" or "several" means two or more, unless otherwise expressly and specifically limited.

Figure 1A:
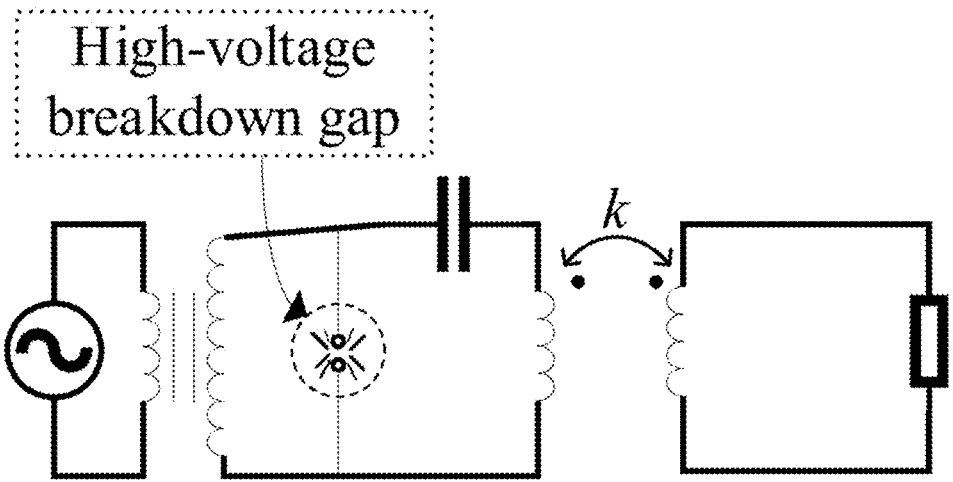
FIG. 1(a) is a circuit diagram illustrating a self-oscillating WPT achieved by a high-voltage breakdown spark gap proposed by Tesla.
Figure 1B:
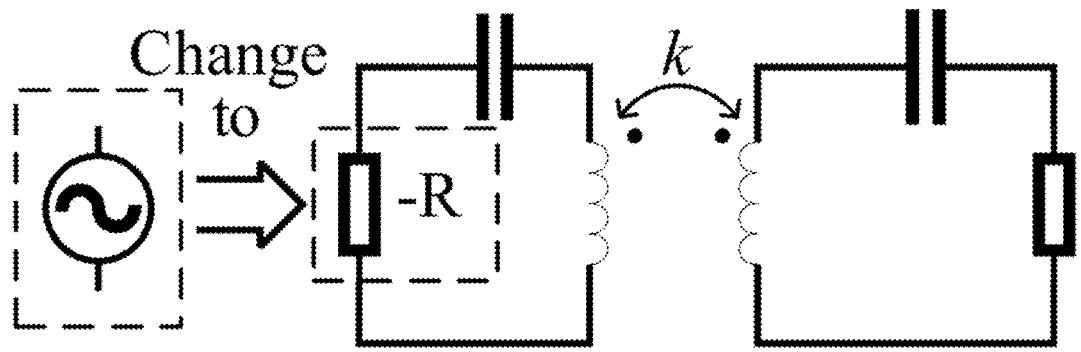
FIG. 1(b) is a circuit diagram illustrating a self-oscillating WPT achieved through negative resistor equivalence.

FIG. 1(a) is a circuit diagram illustrating a self-oscillating WPT achieved by a high-voltage breakdown spark gap proposed by Tesla. FIG. 1(b) is another circuit diagram illustrating switch disconnection control according to some embodiments of the present disclosure.

The self-oscillating WPT refers to a wireless power transfer technology that enables resonance energy transfer without the need for an external drive signal. The self-oscillating WPT may automatically maintain oscillation through a resonance loop and feedback mechanism to achieve efficient energy transmission.

There are a plurality of ways to generate the self-oscillating WPT. For example, as shown in FIG. 1(a), Tesla uses a transformer to generate high voltage and thus break down an air gap to construct a resonant loop, which is actually a primitive self-oscillating WPT. Due to limitations of device fabrication and power electronics technology at that time, and because of significant losses associated with piercing the air gap, the type of the self-oscillating manner is no longer relevant today.

As another example, as shown in FIG. 1(b), constructing the resonant loop through conversion of a negative resistor form an alternating current (AC) source is another manner to achieve the self-oscillating WPT. By utilizing a nonlinear parity model constructed with the negative resistor, the WPT achieves stable power transmission with high and constant transmission efficiency under a condition of varying coupling dynamics. While the negative resistor may realize the self-oscillating WPT, the design of the negative resistor circuit is very complex, which not only raises the cost, but also reduces the robustness of the system.

Therefore, it is desired to provide a wireless power transfer system for zero current switching (ZCS) operation under charge-blocking oscillation, which may achieve efficient and stable energy transmission without the need for a complex negative resistor circuit. By utilizing the zero current switching (ZCS) technology, switching operation may be performed at the moment when a current is zero, thereby reducing switching losses and improving overall efficiency. In addition, a design of the charge-blocking oscillation may effectively suppress an electromagnetic interference, further enhancing the reliability and applicability of the wireless power transfer system for zero current switching (ZCS) operation under charge-blocking oscillation.

Embodiments of the present disclosure provide the wireless power transfer system for zero current switching (ZCS) operation under charge-blocking oscillation (also referred to as a system, a self-oscillating system with zero current switching control, and henceforth referred to as a wireless power transfer system) comprising a power supply, a transmitter terminal, and a receiver terminal, the transmitter terminal has a resonance capacitor and a transmitter coil, the receiver terminal has a receiver coil, the receiver coil is coupled with the transmitter coil to produce a magnetic field coupling to achieve a purpose of a wireless power transfer.

Figure 2A:
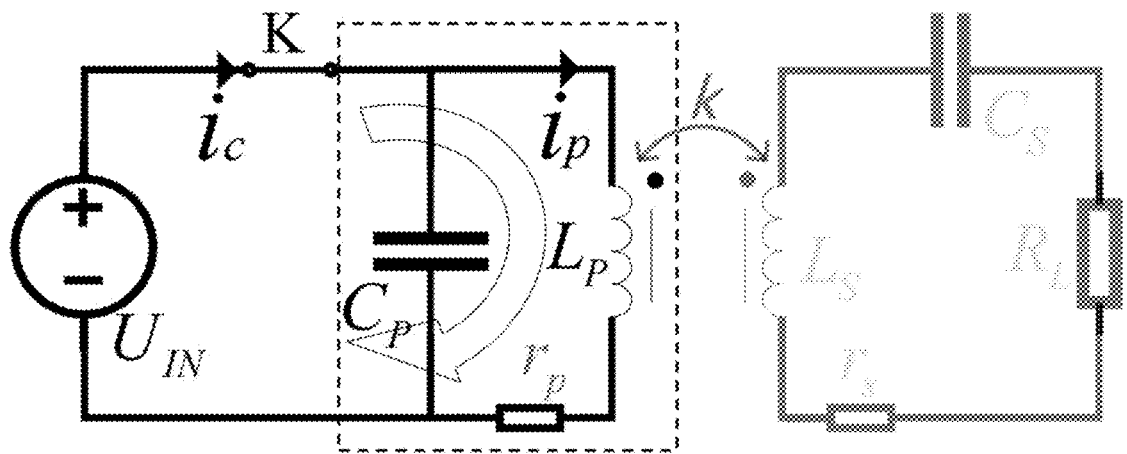
FIG. 2(a) is a circuit schematic diagram illustrating switch conduction control according to some embodiments of the present disclosure.
Figure 2B:
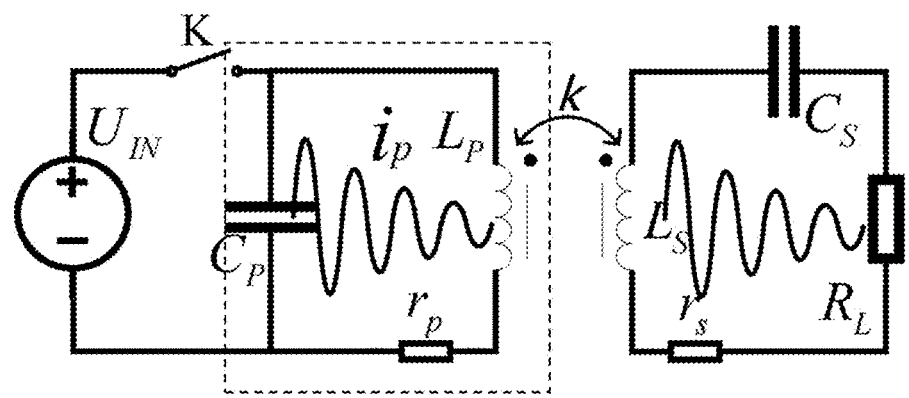
FIG. 2(b) is another circuit diagram illustrating switch disconnection control according to some embodiments of the present disclosure.

FIG. 2(a) is a circuit schematic diagram illustrating switch conduction control according to some embodiments of the present disclosure. FIG. 2(b) is another circuit diagram illustrating switch disconnection control according to some embodiments of the present disclosure.

In some embodiments, as shown in FIGS. 2(a) to 2(b), a voltage at both ends of a power supply is $U_{IN}$, a capacitance value of a resonance capacitor is $C_P$, an inductance value of a transmitter coil is $L_P$, and an inductance value of a receiver coil is $L_S$. The capacitance value may be determined by querying a product specification of the resonance capacitor.

A receiver terminal refers to an energy receiver device in a wireless power transfer system, which is configured to receive an electromagnetic wave emitted by a transmitter terminal and convert the electromagnetic wave into power.

The transmitter terminal refers to an energy transmitter device in the wireless power transfer system, which is configured to transmit energy in the form of the electromagnetic wave.

In some embodiments, referring to FIGS. 2(a) to 2(b), the transmitter terminal also includes an equivalent resistor and a control switch K. The equivalent resistor is connected in series with the transmitter coil and then in parallel with the resonance capacitor to form a charge-blocking oscillation circuit. The control switch K is connected with both ends of the power supply after being connected in series with the charge-blocking oscillation circuit.

A resistor value of the equivalent resistor is $r_P$, which may be determined by querying a product specification of the equivalent resistor.

The charge-blocking oscillation circuit refers to a circuit capable of self-oscillating in the wireless power transfer system by controlling a charge and blockage of the energy.

In some embodiments, in the charging process (also referred to as a charge stage), the control switch is closed, the power supply is charged to a resonance circuit, and the energy is stored in the resonance capacitor and the transmitter coil. In the blockage stage, the control switch is disconnected, and the energy in the resonance circuit is blocked, resulting in oscillation of the resonance circuit. In the self-oscillating stage, the energy in the resonance circuit oscillates back and forth between the transmitter coil and the resonance capacitor while the energy is transmitted to the receiver terminal through the magnetic field coupling.

In some embodiments, by forming the charge-blocking oscillation circuit, the oscillation of the resonance element may be maintained without the need for external continuous energy input, thereby achieving an efficient wireless power transfer.

In some embodiments, according to FIG. 2(a), when the control switch K is conducted, the transmitter terminal is in the charging process, and the transmitter terminal is connected to the power supply and energized.

In some embodiments, according to FIG. 2(b), when the control switch K is disconnected, the transmitter terminal is in a self-oscillating stage, the transmitter terminal forms the blockage. There is an energy oscillation between the transmitter coil and the resonance capacitor, and the receiver coil at the receiver terminal acquires energy to realize the wireless power transfer.

In some embodiments of the present disclosure, an alternating operation of the charging process and the self-oscillating stage not only optimizes the energy transmission efficiency, but also reduces the system loss and improves the overall performance.

In some embodiments, a side of the transmitter coil close to the control switch has a first voltage detection terminal, and a second voltage detection terminal is provided between the control switch and the power supply; in response to determining that a voltage of the first voltage detection terminal reaches a predetermined maximum value, the control switch is conducted; and in response to determining that an energy of the second voltage detection terminal reaches a predetermined minimum value, the control switch is disconnected. More descriptions regarding the embodiment may be found elsewhere in the present disclosure (e.g., FIG. 5(a) and related descriptions thereof).

Figure 4A:
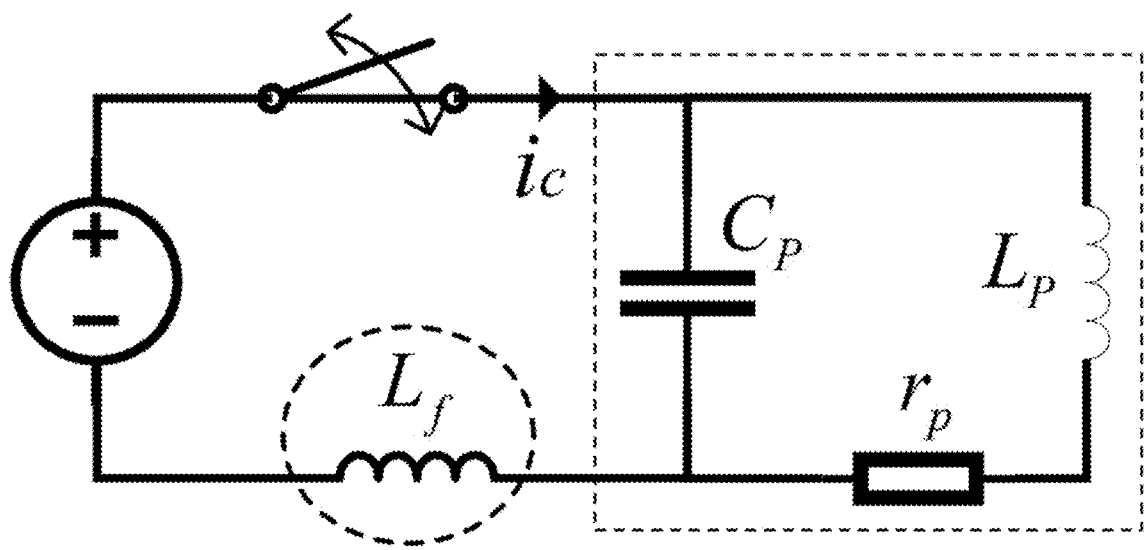
FIG. 4(a) is another circuit diagram according to some embodiments of the present disclosure.

More descriptions regarding the transmitter terminal may be found elsewhere in the present disclosure (e.g., FIG. 4(a) and related descriptions thereof)

In some embodiments, the control switch K is provided between a positive pole of the power supply and the charge-blocking oscillation circuit. For example, as shown in FIGS. 2(a) to 2(b), the control switch K is provided between the transmitter coil and the receiver coil. In some embodiments, the control switch K may also be provided at other predetermined locations between the positive pole of the power supply and the charge-blocking oscillation circuit.

The present disclosure, through the design as shown in FIG. 2(a) and FIG. 2(b), a passive self-oscillating WPT energy transfer manner is achieved. The process of the charge-blocking oscillation isolates the relationship between a drive frequency and an operating frequency, such that the operating frequency of the wireless power transfer system is only related to the resonance parameter. Compared with a conventional design, the present disclosure does not require any additional circuit and measurement control to achieve a resonance operation, which has better cost advantage and system characteristics.

In some embodiments, the wireless power transmitter system of the present disclosure achieves the self-oscillating by utilizing the charge-blocking, whereby the energy is blocked by blocking the energized resonant cavity, causing the energy to be enclosed inside a closed-loop resonance loop, at this time, the energy oscillates. Compared with the conventional self-oscillating WPT based on the negative resistor, the present disclosure has a fewer count of switching devices and do not require any additional circuit design, thus having a better cost and a robustness.

The working principle of the wireless power transmitter system in the present disclosure is as follows:

1. The Charging Process:

In some embodiments, unlike the undamped self-oscillating based on the negative resistor as shown in FIG. 1(b), the present disclosure proposes a damped self-oscillating. The damped self-oscillating may be achieved through the continuous oscillation and energy transmitter of the resonant cavity completed by frequency based on an energy injection and the blockage. The present disclosure includes two processes of the charging and the oscillating and an action of the blockage.

In some embodiments, as shown in FIG. 2(a), when the control switch K is conducted, the transmitter terminal is connected to the power supply and energized, at which point the input energy to the wireless power transfer system is composed of an energy $W_C$ of the resonance capacitor and an energy $W_L$ of the transmitter coil.

The energy $W_C$ of the resonance capacitor is stored as a voltage in the resonance capacitor. In some embodiments, the energy $W_C$ of the resonance capacitor may be determined by an energy storage equation for the capacitor, e.g., $W_C = \frac{1}{2} C_P u_P^2$, $W_C$ is an energy of the resonance capacitor, $C_P$ is a capacitance value of the resonance capacitor, and $u_P$ is a voltage at boss ends of the resonance capacitor.

The energy $W_L$ of the transmitter coil is stored in the transmitter coil in form of the current. In some embodiments, the energy $W_L$ of the transmitter coil may be determined by an inductance value energy storage equation, e.g., $$W_L = \frac{1}{2} L_P i_P^2,$$

$W_L$ is an energy of the transmitter coil, $L_P$ is an inductance value of the transmitter coil, $i_P$ is a current in the current circuit, for example, $i_P$ is the current in the transmitter coil. Since the transmitter coil is in series with the equivalent resistor, $i_P$ is also the current in the equivalent resistor.

In some embodiments, the WPT transmits the energy through electromagnetic induction between the coils, implying that the absolute value of the inductance value $L_P$ of the transmitter coil (uH level) is much larger than the capacitance value $C_P$ of the resonance capacitor (nF level), so the charging process may be considered only for the energy $W_L$ of the transmitter coil. The energy $W_L$ of the transmitter coil is determined by a charging cutoff current $I_{P,M}$. The charging cutoff current $I_{P,M}$ is also a maximum instantaneous current on the transmitter coil during operation of the wireless power transmitter system.

The following equation (1) is a loop voltage equation for the charging process: (all symbols of the equation correspond to FIG. 2(a))

$$U_{IN} = U_{r_P} + U_{L_P} = r_P i_P + L_P \frac{di_P}{dt} \quad (1)$$

$U_{IN}$ is a voltage at both ends of the power supply, $U_{r_P}$ is a voltage at both ends of the equivalent resistor, $U_{L_P}$ is a voltage at both ends of the transmitter coil, $i_P$ is a current in the transmitter coil, $L_P$ is an inductance value of the transmitter coil, and $$\frac{di_P}{dt}$$

is a rate of change of the current in the inductance value with time.

In some embodiments, solving the above equation (1) may obtain a charging cutoff current $I_{P,M}$ at a charging time $t_{on}$ is:

$$I_{P,M} = \frac{U_{IN}}{r_P}\left(1 - e^{-\frac{t_{on}}{L_P/r_P}}\right) \quad (2)$$

$I_{P,M}$ is the charging cutoff current at the charging time $t_{on}$ and $r_P$ is a resistance value of the equivalent resistor.

In order to reduce the loss of the equivalent resistor during the charging process, it is necessary to make the $r_P$ voltage smaller than $$L_P\left(r_P i_P \ll L \frac{di_P}{dt}\right),$$

which may be transformed into $t_{on} \ll L_P/r_P$. At this point, the Taylor expansion of the equation (2) yields $i_P$ as:

$$I_{P,M} \approx \frac{U_{IN}}{r_P}\left[1 - \left(1 - \frac{t_{on}}{\frac{L_P}{r_P}}\right)\right] = \frac{U_{IN} t_{on}}{L_P} \quad (3)$$

The energy $W_L$ of the transmitter coil represents an input energy of the wireless power transmitter system for each charging process, and the input power $P_{IN}$ of the wireless power transmitter system may be obtained by multiplying the transmitter coil energy with the charging frequency $f_C$ as shown in an equation (4) below:

$$P_{IN} = f_C W_L = \frac{(U_{IN} t_{on})^2 f_C}{2 L_P} \quad (4)$$

The above analysis ignores the effect of the receiver terminal, due to the fact that during charging, a high frequency current component of the current $i_P$ of the transmitter coil is less than or equal to a component threshold, which results in the induced voltage generated on the receiver coil being negligible. The component threshold is a threshold for determining whether the high frequency current component is sufficiently small, which may be set by default by a skilled professional.

A connection between the charging time $t_{on}$, the charging frequency $f_C$, the charging cutoff current $I_{P,M}$, and the input power $P_{IN}$ may be established by the equation (3) and the equation (4), while the connection only holds when an initial state is zero, i.e., the energy is consumed in each oscillation cycle. The actual full response analysis needs to add the zero-input response of the oscillation process, and the conversion time of charging and oscillation has a great influence on the energy input and output and switching loss. In the application, the charging frequency $f_C$ and charging time $t_{on}$ may be further designed by a mathematical simulation and a waveform analysis. At the same time, the above analysis also ignores the effect of the equivalent resistor of the transmitter coil, this is because the charging time is very short in order to ensure the efficiency, and at this time, the current $i_P$ of the transmitter coil is small, and the voltage loaded on the equivalent resistor is negligibly small.

2. The Self-Oscillating Stage:

In some embodiments, as shown in FIG. 2(b), the control switch K is disconnected after the circuit is energized, at which point the charge-blocking oscillation circuit blocks the energy in the resonant cavity. Because the current $i_P$ of the transmitter coil cannot change abruptly, the current $i_P$ of the transmitter coil after blocking may continue to charge the resonance capacitor, and when the voltage on the resonance capacitor reaches a maximum value, the resonance capacitor may be charged in the opposite direction, thus causing the energy oscillation.

Figure 3A:
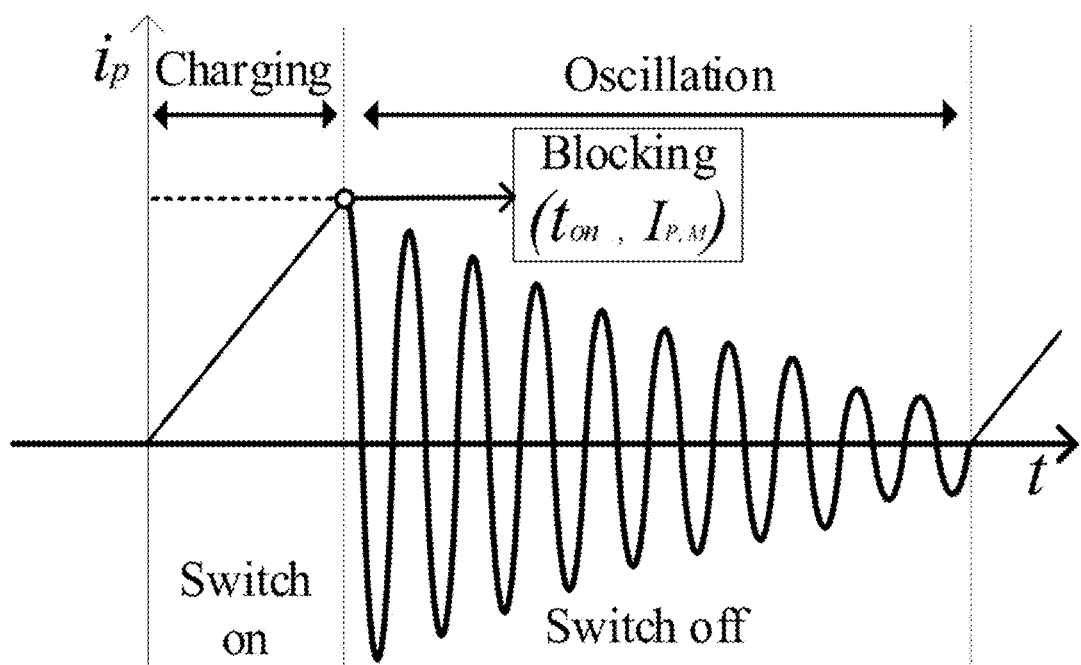
FIG. 3(a) is an ideal current waveform diagram illustrating a transmitter coil of a WPT during a charge-blocking oscillation according to some embodiments of the present disclosure.

FIG. 3(a) is an ideal current waveform diagram illustrating a transmitter coil of a WPT during a charge-blocking oscillation according to some embodiments of the present disclosure.

In some embodiments, an ideal waveform corresponding to the current $i_P$ of the transmitter coil during the self-oscillating process is schematically shown in FIG. 3(a), wherein the highest point of the current $I_{P,M}$ is a blockage instant.

In some embodiments, when the current of the transmitter coil begins to oscillate, a high frequency electromagnetic field is generated, and at this time, the receiver terminal senses the foregoing electromagnetic field and acquires the energy, thereby realizing the wireless power transfer.

Figure 3B:
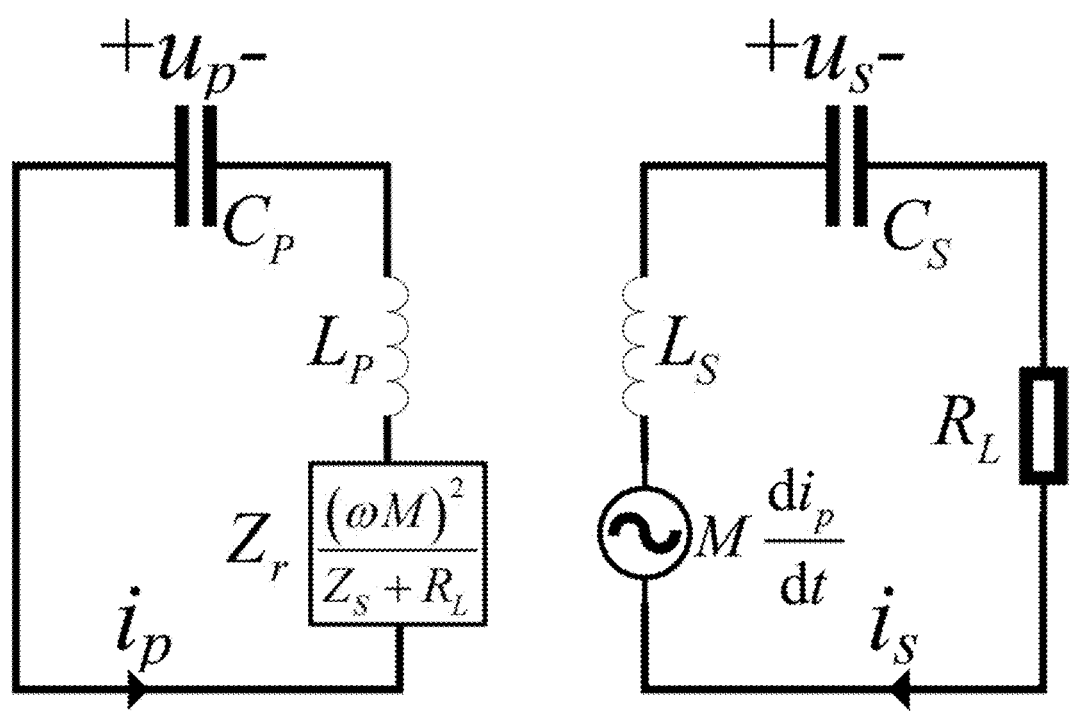
FIG. 3(b) is an equivalent circuit diagram illustrating an oscillating energy transfer process based on energy blocking according to some embodiments of the present disclosure.

FIG. 3(b) is an equivalent circuit diagram illustrating an oscillating energy transfer process based on energy blocking according to some embodiments of the present disclosure.

In some embodiments, the same as the conventional WPT analysis, as shown in FIG. 3(b), the receiver terminal is equivalent to the transmitter coil in series with a reflected impedance with an impedance value of $Z_r$. An impedance value of the loop reactance at the receiver terminal is $Z_S$, and in some embodiments, the impedance value of the loop reactance may be obtained by calculating a physical equation. For example, the impedance value of the loop reactance is $Z_S=j\omega L_S+1/j\omega C_S$. j is an imaginary unit, and ω is an angular frequency of an AC electrical signal, which is used to describe the angle at which the AC electrical signal oscillates per unit time, and $C_S$ is a capacitance value of the loop reactance.

In some embodiments, as shown in FIG. 3(b), $R_L$ is a load resistance of the receiver terminal.

In analyzing the self-oscillating circuit, the following equation (5) shows a set of equations for a symmetrical circuit conventionally constructed through a negative resistor:

$$\begin{cases} i_P = -C_P \dfrac{du_P}{dt} \\ i_S = -C_S \dfrac{du_S}{dt} \\ L_P \dfrac{di_P}{dt} + M \dfrac{di_S}{dt} = u_P \\ \left(\text{Negative resistor: } L_P \dfrac{di_P}{dt} + M \dfrac{di_S}{dt} + u_P = U_{-R}\right) \\ M \dfrac{di_P}{dt} + L_S \dfrac{di_S}{dt} + u_S + R_L i_S = 0 \end{cases} \quad (5)$$

As shown in FIG. 3(b), since the resonance capacitor, the transmitter coil, and the reflected impedance are in series at this time, $i_P$ is also the current of the resonance capacitor, the transmitter coil, and the reflected impedance. $u_P$ is a voltage at both ends of the resonance capacitor.

$$\frac{du_P}{dt}$$

is a rate of change of the voltage at ends of the resonance capacitor with time. Since at this time the loop reactance and the receiver coil are connected in series, $i_s$ is also the current of the loop reactance and the current of the receiver coil. $C_S$ is a capacitance value of the loop reactance. $u_S$ is the value of a voltage at ends of the loop reactance. M is a mutual inductance coefficient.

$$\frac{di_P}{dt}$$

is a rate of change of the current with time in the left series circuit of FIG. 3(b).

$$\frac{di_s}{dt}$$

is a rate of change of the current with time in the right series circuit of FIG. 3(b).

A left series circuit of FIG. 3(b) is a circuit formed by the resonance capacitor, the transmitter coil, and the reflected impedance. The right series circuit of FIG. 3(b) is a circuit formed by the loop reactance and the receiver coil.

An equation (5) demonstrates a difference between the negative resistor and the present disclosure in terms of the equation. Since a complex nonlinear characteristic of a voltage $u_{-R}$ of the negative resistor, it is difficult to use conventional circuit analysis manner. Therefore, the coupled mode theory model is usually used to analyze it.

In some embodiments, there is no negative resistor in the system of fourth-order equations constructed in the present disclosure, so the characteristic may be analyzed directly by solving the circuit equations.

Figure 3C:
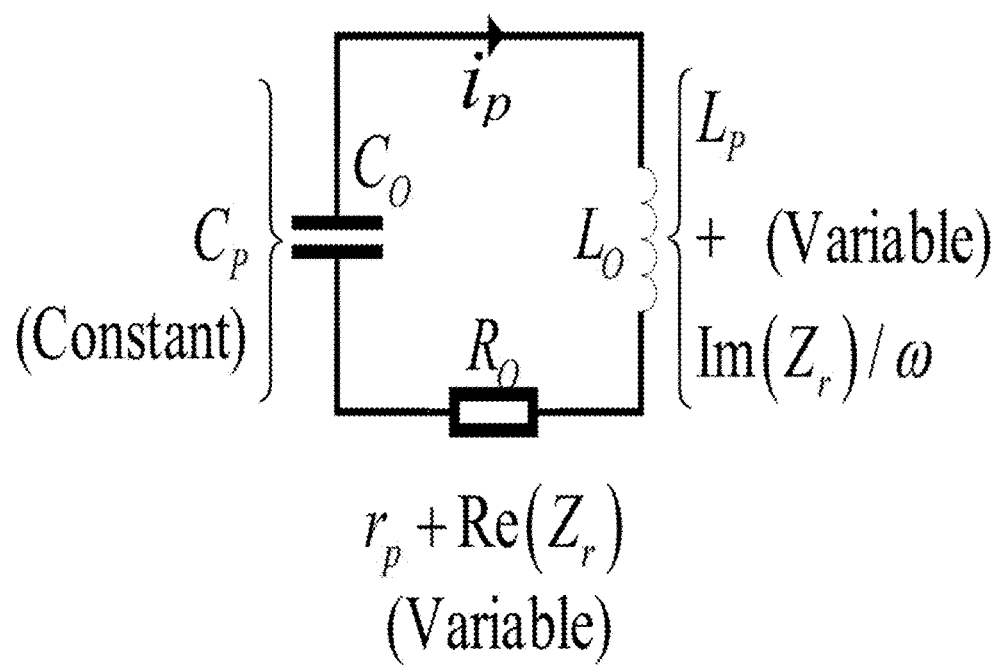
FIG. 3(c) is an equivalent circuit diagram illustrating a transmitter terminal based on energy blocking according to some embodiments of the present disclosure.

FIG. 3(c) is an equivalent circuit diagram illustrating a transmitter terminal based on energy blocking according to some embodiments of the present disclosure.

In some embodiments, FIG. 3(c) illustrates an equivalent second-order LCR circuit at the transmitter terminal of the oscillation process, wherein an equivalent inductance value $L_O$ is a sum of an inductance value $L_P$ of the transmitter coil and the equivalent inductance value of the reflection impedance, an equivalent capacitance $C_O$ is a capacitance value $C_P$ of the resonance capacitor, and a resistance value $R_O$ of the equivalent resistor is an equivalent damping of the resistance value $r_p$ of the equivalent resistor at the transmitter terminal and an impedance value $Z_r$ of the reflection impedance. The specific equation is as follows, at this time the equivalent inductance value $L_O$ and the equivalent capacitance value $C_O$ constitute an angular frequency $\omega_r$, which is the resonance angular frequency of the system $$\left(\omega_r = \sqrt{\frac{1}{L_o C_o}}\right).$$

$$\begin{cases} C_O = C_P \\ R_O = r_p + \text{Re}(Z_r) \\ L_O = L_P + \text{Im}(Z_r)/\omega \end{cases} \quad (6)$$

Whether the oscillation angular frequency $\omega_O$ is equal to the resonance frequency $\omega_r$ is the key to whether the present disclosure realizes the self-oscillating resonance tracking. If only study the relationship between the oscillation angular frequency $\omega_O$ and the resonance frequency $\omega_r$, the equivalent inductance value $L_O$ and the resistance value of the equivalent resistor $R_O$ is set as a quantization that may simplify the calculation process. When it is necessary to further investigate the relationship between the actual value of the resistance value $R_O$ of the equivalent resistor and a splitting frequency, it is necessary to consider the equivalent inductance value $L_O$ and the resistance value $R_O$ of the equivalent resistor as variables, which may be further investigated in equation (16) and equation (17).

A loop current $$i_P = -C_O \frac{du_C}{dt},$$

a voltage $$u_R = R_O i_P = -R_O C_O \frac{du_C}{dt}$$

of the resistor, and a voltage $$u_L = L_O \frac{di}{dt} = -L_O C_O \frac{d^2 u_C}{dt^2}$$

of the inductor in FIG. 3(c), and substituting them into the transmitter terminal loop voltage equation in the equation (5) yields the following linear constant coefficient second-order homogeneous differential equation:

$$L_O C_O \frac{d^2 u_C}{dt^2} + R_O C_O \frac{du_C}{dt} + u_C = 0 \quad (7)$$

Solving the above differential equation (7) may be set to $u_C = A e^{pt}$ and substitution gives the characteristic equation as:

$$L_O C_O P^2 + R_O C_O P + 1 = 0 \quad (8)$$

Solving the above equation (8) yields a characteristic root P as:

$$P_{1,2} = -\frac{R_O}{2L_O} \pm \sqrt{\left(\frac{R_O}{2L_O}\right)^2 - \frac{1}{L_O C_O}} = -\sigma \pm \omega_r \sqrt{\frac{1}{(4Q^2)} - 1} \quad (9)$$

At this point, a quality factor is $$Q = \frac{1}{R_O} \sqrt{\frac{L_O}{C_O}}.$$

A damping coefficient in the wireless power transmitter systems is $$\sigma = \frac{R_O}{2L_O}.$$

Since P has both positive and negative signs, $u_C$ may be written as:

$$u_C = A_1 e^{P_1 t} + A_2 e^{P_2 t} \quad (10)$$

The constants $A_1$ and $A_2$ in the above equation (10) may be solved by substituting the initial oscillation conditions as shown in equation (11) below:

$$\left. \begin{array}{l} A_1 + A_2 = U_{int} \\ P_1 A_1 + P_2 A_2 = -I O_{int} \end{array} \right\} \quad (11)$$

Assuming that the initial oscillation voltage $U_{int}$ is zero, and the initial oscillation current $I_{int}$ is $I_{P,M}$, solving the above equation (11) yields:

$$\left. \begin{array}{l} A_1 = \frac{I_{P,M}}{C_O(P_2 - P_1)} \\ A_2 = \frac{I_{P,M}}{C_O(P_1 - P_2)} \end{array} \right\} \quad (12)$$

Analyzing the equation (9) and equation (10), it may be seen that when Q<0.5, $U_C$ has two unequal negative real roots, then the circuit does not oscillate at this time. When Q<0.5, the equation has a pair of conjugate complex roots with negative real part, and by combining these two conjugate complex roots, $U_C$ may be obtained as:

$$u_C = U_{P,M} e^{-\sigma t} \sin\left(\omega_r t \sqrt{1 - \frac{1}{4Q^2}}\right) \quad (13)$$

$U_{P,M}$ is an initial oscillating voltage, and $U_{P,M}$ is also a maximum instantaneous voltage when the circuit is running. Ideally (e.g., ignoring resistor losses, ignoring device non-linearities, etc.), the value of $U_{P,M}$ is determined by charging the capacitor with $I_{P,M}$, for example, $U_{P,M} = I_{P,M}/(wC_O)$.

Bringing $$i_P = -C_O \frac{du_C}{dt}$$

into equation (13) yields $i_p$ for the self-oscillating stage:

$$i_p = I_{P,M} e^{-\sigma t} \sin\left(\omega_r t \sqrt{1 - \frac{1}{4Q^2}} + \beta\right) \quad (14)$$

The relationship between $\omega_O$ and $\omega_r$ may be obtained through equation (8) and equation (9) as follows:

$$\omega_O = \omega_r \sqrt{1 - 1/(4Q^2)} \approx \omega_r \text{ for } Q \gg 0.5 \quad (15)$$

In the WPT, since |L|>>|C|, then Q>>0.5. The equation (15) shows that the oscillation angular frequency of the coil current is approximately equal to the resonance frequency. So far, the present disclosure theoretically verifies the feasibility of the proposed system for resonance tracking, and since $\omega_O$ is only related to the resonance parameter, the present disclosure does not require any additional circuit and control compared to the conventional manner.

The above is based on $L_O$ and $R_O$ for quantitative analysis. In order to further study $\omega_O$, the actual value of $\omega_O$ may be obtained by substituting equation (5) into equation (15):

$$\omega_o = \sqrt{\frac{1}{j\omega L_P C_P + \frac{j\omega C_P Z_S M^2}{R_L^2 + Z_S^2}} - \frac{\omega^4 R_L^2 M^4}{4\left(j\omega L_P + \frac{j\omega Z_S M^2}{R_L^2 + Z_S^2}\right)^2 (R_L^2 + Z_S^2)^2}} \quad (16)$$

Figure 3D:
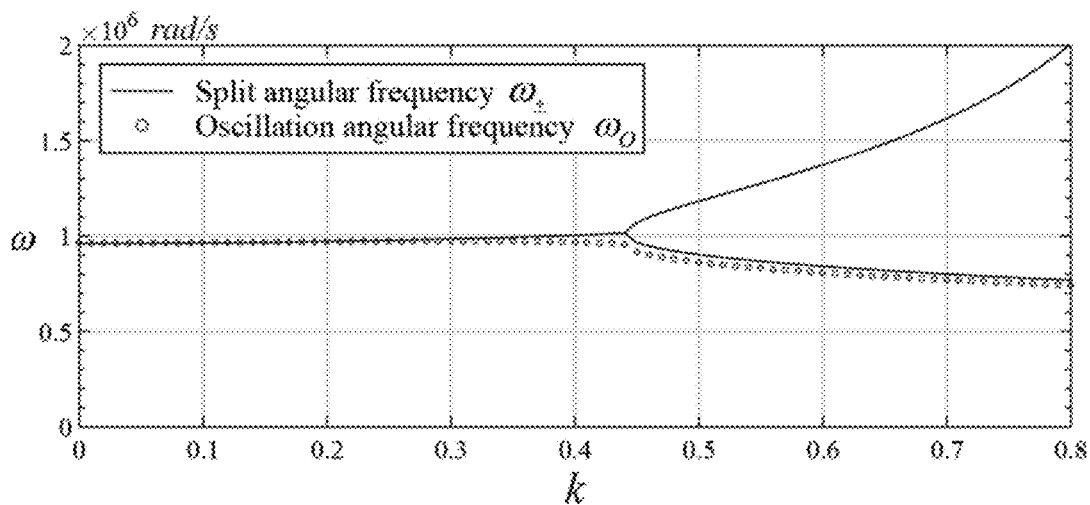
FIG. 3(d) is a schematic diagram illustrating splitting frequencies and actual values of $\omega_0$ under different k in the simulation according to some embodiments of the present disclosure.

FIG. 3(d) is a schematic diagram illustrating splitting frequencies and actual values of $\omega_O$ under different k in the simulation according to some embodiments of the present disclosure.

In some embodiments, simulating the above equation (16) yields the actual value of $\omega_O$ under different K as shown in FIG. 3(d). Also, the splitting frequency of the system is shown in FIG. 3(d), which uses the following simulation equation (17):

$$\omega_\pm = \sqrt{\frac{(2 - 1/Q_{RX}^2) \pm \sqrt{(2 - 1/Q_{RX}^2)^2 - 4(1 - k^2)}}{2(1 - k^2)}} \omega_{LC} \quad (17)$$

At this point, $$Q_{RX} = \frac{1}{R_L} \sqrt{\frac{L_S}{C_S}}$$

Figure 3E:
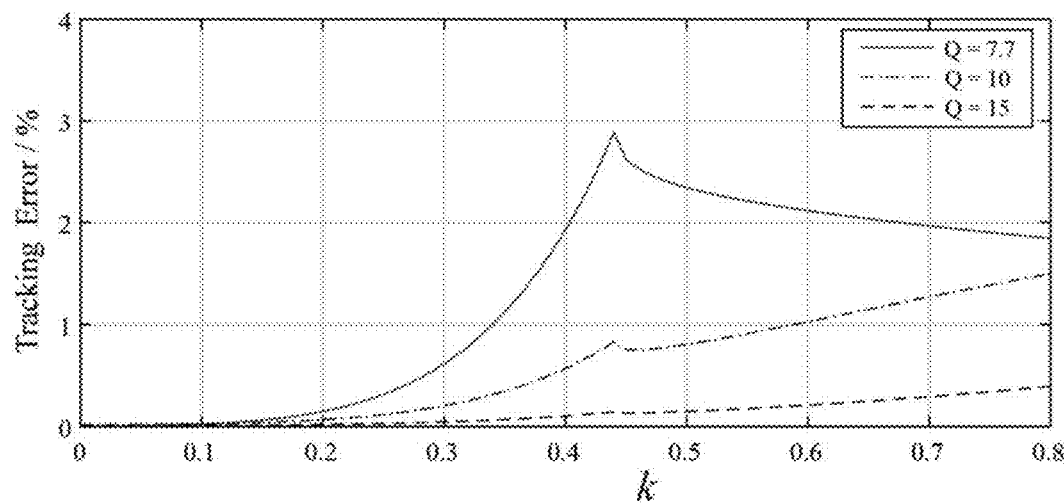
FIG. 3(e) is a tracking error diagram under different Q according to some embodiments of the present disclosure.

FIG. 3(e) is a tracking error diagram under different Q according to some embodiments of the present disclosure.

Comparison of $\omega_O$ with $\omega_\pm$ yields an error of 0.96% for both, which is mainly due to Q. The error may be further reduced by increasing the value of Q, which is demonstrated and confirmed in FIG. 3(e). It may also be seen from FIG. 3(e) that the error becomes larger as the coupling is elevated because it is the equivalent resistance of the reflected impedance that increases to a greater extent than the equivalent resistor.

Table 1 below indicates a difference between the manner of realizing the self-oscillating WPT by the negative resistor equivalence shown in FIG. 1(b) (referred to as the negative resistor manner) and the manner in the present disclosure (referred to as a charge-blocking oscillation manner):

TABLE 1

A Difference between the negative resistor manner and the charge-blocking oscillation

| manner | the negative resistor | | The charge-blocking oscillation |
|---|---|---|---|
| | AP feedback | inverter current feedback | |
| efficiency | less than 60% | greater than 90% | greater than 90% |
| cost | high | extremely high | extremely low |
| robustness | affected by the feedback circuitry | influenced by the control system | strong |
| topicality | basically no delay | feedback delay | no latency |

FIG. 4(a) is another circuit diagram according to some embodiments of the present disclosure.

In some embodiments, as shown in FIG. 4(a), the transmitter terminal further includes a buffer filter inductor (an inductance value of the buffer filter inductor is $L_f$), the buffer filter inductor being connected in series with the charge-blocking oscillation circuit, and the buffer filter inductor being provided between a negative pole of the power supply and the charge-blocking oscillation circuit.

The circuit in FIG. 2(a) and FIG. 2(b) are in actual operation because the power supply is directly connected to the resonance capacitor, and there may be a large inrush current when the control switch K is turned on for charging, resulting in loss and damage to the device. To mitigate the impact current at the moment the switch tube turns on, it is necessary to series connect a buffer filter inductor on the power supply bus, achieving the purpose of zero current turn on control for the control switch. This leads to the formation of a wireless power transfer system for zero current switching (ZCS) operation under charge-blocking oscillation as described in the present disclosure.

In some embodiments, an inductance value of the buffer filter inductor is within a range of 15 nH to 15 uH. In some embodiments, the inductance value of the buffer filter inductor is 1.5 uH.

In some embodiments of the present disclosure, by selecting the inductance value of the buffer filter inductor is within a range of 15 nH to 15 uH, a filtering performance and an energy transfer efficiency of the wireless power transmitter system can be effectively optimized.

In some embodiments of the present disclosure, by selecting the inductance value of the buffer filter inductor is 1.5 uH, it is possible to optimize the filtering performance and the stability of the wireless power transmitter system while further ensuring high efficiency of energy transmission.

The design of the buffer filter inductor may be started from the simulation, and the equivalent set of circuit equations after adding the buffer filter inductor is:

$$\begin{cases} L_f \frac{di_{in}}{dt} + u_{Co} = u_{in} \\ L_f \frac{di_{in}}{dt} + L_p \frac{di_p}{dt} = u_{in} \end{cases} \quad (18)$$

Simulation of the above equation (18) is simulated with $L_P$=23 μH; $C_P$=47 nf; $r_P$=0.5Ω; $L_S$=23 μH; $C_S$=47 nf; $r_S$=0.5Ω; $R_L$=12.5Ω; K=0.3. In some embodiments, the value of each parameter at the time of simulation may also be other values.

Figure 4B:
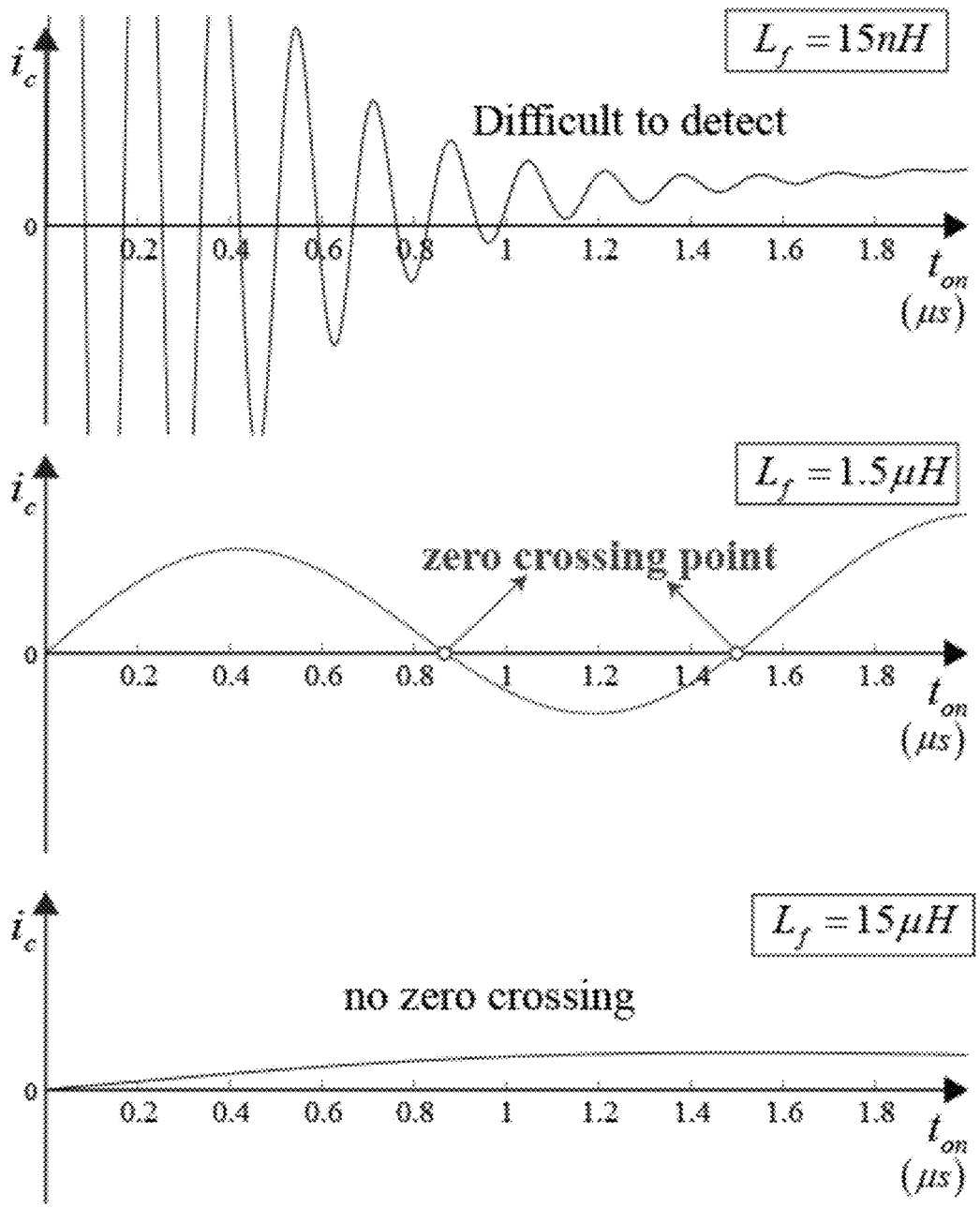
FIG. 4(b) is a schematic diagram illustrating a variation condition of $i_C$ when three different buffer filter inductor parameters are selected for the circuit diagram of FIG. 4(a)

FIG. 4(b) is a schematic diagram illustrating a variation condition of $i_C$ when three different buffer filter inductor parameters are selected for the circuit diagram of FIG. 4(a).

Simulating the above equation (18) yields the variation of the charging current $i_C$ under different inductance value $L_f$ of the buffer filter inductor as shown in FIG. 4(b).

In some embodiments, when the inductance value $L_f$ of the buffer filter inductor is large (e.g., $L_f$=15 uH, etc.), the resonance period of the buffer filter inductor and the resonance capacitor is longer, and since the charging time $t_{on}$ is shorte, $i_C$ does not complete the oscillation in one charging cycle, and thus the charging current $i_C$ cannot be controlled to zero.

In some embodiments, when the inductance value $L_f$ of the buffer filter inductor is low (e.g., $L_f$=15 uH, etc.), the charging current $i_C$ oscillates at a high frequency, and although the charging current $i_C$ crosses zero several times, the excessively fast rate of change makes it difficult to detect as well as control.

Therefore, the principle of selecting the inductance value $L_f$ of the buffer filter inductor can ensure that it oscillates 1 to 2 times in a charging time is preferable; for example, according to the circuit experimental parameters in the present disclosure, the inductance value $L_f$ of the buffer filter inductor is designed to be 1.5 nH.

Figure 4C:
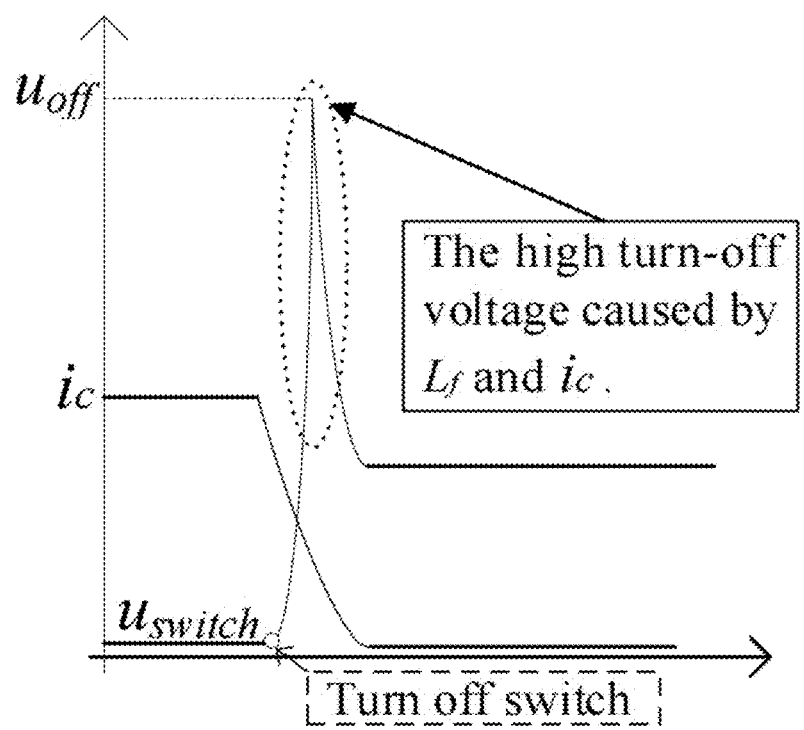
FIG. 4(c) is a schematic diagram illustrating a turn-off voltage of a control switch presented in the circuit diagram of FIG. 4(a)

FIG. 4(c) is a schematic diagram illustrating a turn-off voltage of a control switch presented in the circuit diagram of FIG. 4(a).

In some embodiments, as shown in FIG. 4(c), the inrush current when the control switch K is conducted may be addressed through the introduction of a buffer filter inductor. However, when the control switch K is disconnected, since the inductance value and the current cannot be varied abruptly, this may load the control switch K with an extremely high turn-off pulse voltage $u_{off}$, which may also cause losses and device damage.

In some embodiments, the shutdown pulse voltage $u_{off}$ is mainly determined by the inductance value $L_f$ of the buffer filter inductor and the charging current $i_C$, which may be written as equation (19):

$$u_{off} = u_{in} - L_f \frac{di_c}{dt} - u_{Cp} \approx L_f \frac{di_c}{dt} \quad (19)$$

In some embodiments, controlling the charging current to zero by designing the inductance value of the buffer filter inductor $L_f$ with the charging time $t_{on}$ is an effective way to solve the problem of high turn-off voltage. In the charging process of the actual WPT circuit with the buffer filter inductor, the resonance capacitor not only forms a resonance circuit with the transmitter coil, but also forms a resonance circuit with the buffer filter inductor. Therefore, the charging current $i_C$ in the resonance relationship is not monotonically increasing, and by flexibly designing the inductance value $L_f$ of the buffer filter inductor and accurately controlling the charging time $t_{on}$, the charging current $i_C$ may be zero at the moment of shutdown, thus solving the problem of high shutdown voltage and realizing the ZCS.

In some embodiments of the present disclosure, the inrush current at the time of turning on the control switch can be resolved by adding the buffer filter inductor in the wireless power transfer system for zero current switching (ZCS) operation under charge-blocking oscillation to achieve zero current turning on the control switch.

Figure 5A:
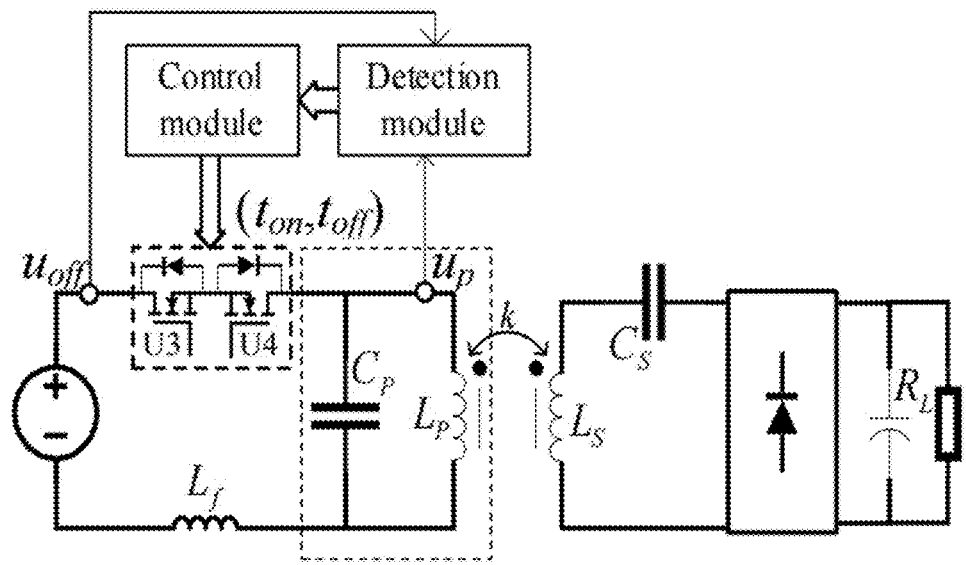
FIG. 5(a) is another circuit diagram according to some embodiments of the present disclosure.

The present disclosure does not require any feedback control on the realization of the self-oscillating WPT through energy blocking. ZCS operation may be achieved by adding the buffer filter inductor and controlling charging time $t_{on}$ to optimize efficiency. However, effective control of the charging time $t_{on}$ requires accurately obtaining the moment when the charging current $i_C$ is zero. The moment when the charging current $i_C$ is zero is obtained by real-time computation of equation (18), which is a feasible option, but it may consume a lot of system computing resources. Therefore, the present disclosure is further improved as follows:

FIG. 5(a) is another circuit diagram according to some embodiments of the present disclosure.

In some embodiments, as shown in FIG. 5(a), a side of the transmitter coil close to the control switch K has a first voltage detection terminal, and a second voltage detection terminal is provided between the control switch K and the power supply. In response to determining that a voltage of the first voltage detection terminal reaches a predetermined maximum value, the control switch K is conducted. In response to determining that an energy of the second voltage detection terminal reaches a predetermined minimum value, the control switch K is disconnected. The predetermined maximum value and the predetermined minimum value may be set by default by a skilled professional.

In some embodiments, close to the control switch K indicates that the first voltage detection terminal is provided in a same circuit that is within a predetermined range from the transmitter coil. The illustration of the position of the first voltage detection terminal in FIG. 5(a) is only an example and may be preset according to the actual situation. The predetermined range may be set by default by a person skilled in the art.

In some embodiments, there is a second voltage detection terminal between the control switch and the power supply, characterizing a location of the second voltage detection terminal between the control switch and the power supply. Merely by way of an example, the second voltage detection terminal is located somewhere between the positive pole of the power supply and the control switch as shown in FIG. 5(a). The location of the second voltage detection terminal may also be predetermined as appropriate.

For the starting moment of charging of the circuit, it is mainly related to the first voltage detection terminal. When the voltage at the first voltage detection terminal is at its lowest value, an equivalent input voltage difference of the circuit is highest, and this is time, the circuit has a large power gain, i.e., a highest input current.

In some embodiments, charging is turned on when the voltage at the first voltage detection terminal reaches the predetermined maximum value, which helps maximize power gain and ensure that the circuitry absorbs energy efficiently. That is, the circuit is energized at the optimal time to maintain stable operation of the wireless power transmitter system or to increase the efficiency of energy transmitter.

In some embodiments, when the energy at the second voltage detection terminal reaches the predetermined minimum value, the control switch is disconnected. Injecting energy at a non-optimal time may be avoided, thereby reducing energy loss or preventing overloading of the circuit.

In some embodiments, for the wireless power transfer system, when the output power is constant, the smaller the current is, the lower the main line loss is, and the higher the efficiency is. Therefore, the system designed in this embodiment is selected to start charging at the highest value of the first voltage detection terminal.

The present embodiment determines the moment when the charging current $i_C$ crosses zero directly by detecting the energy of the second voltage detection terminal. Because the value of the second voltage detection terminal is difficult to measure accurately, the wireless power transmitter system adjusts by judging the energy of the second voltage detection terminal. When the energy of the second voltage detection terminal is the smallest, then the charging current $i_C$ crosses zero, and at that time, the wireless power transmitter system outputs the optimal charging cycle.

In some embodiments, referring to FIG. 5(a), the wireless power transmitter system of the present disclosure further includes a control circuit, the control circuit includes a controller (also referred to as a control module), a first detection circuit, and a second detection circuit (collectively referred to as a detection module), or the like.

In some embodiments, the controller is connected to a drive terminal of the control switch K. The controller is configured to control the conduction or disconnection of the control switch K. An input terminal of the first detection circuit is connected to the first voltage detection terminal, the first detection circuit is configured to detect the voltage of the first voltage detection terminal, an output terminal of the first detection circuit is connected to a signal input terminal of the controller.

In some embodiments, an input terminal of the second detection circuit is connected to the second voltage detection terminal, the second detection circuit is configured to detect the energy of the second voltage detection terminal, and an output terminal of the second detection circuit is connected to the signal input terminal of the controller.

Figure 5B:
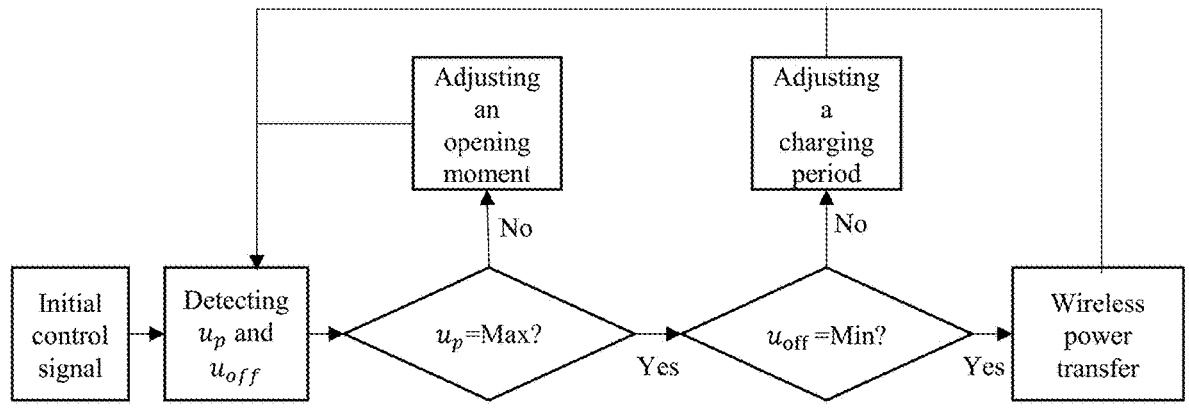
FIG. 5(b) is a block diagram illustrating controlling the circuit of FIG. 5(a)
Figure 5C:
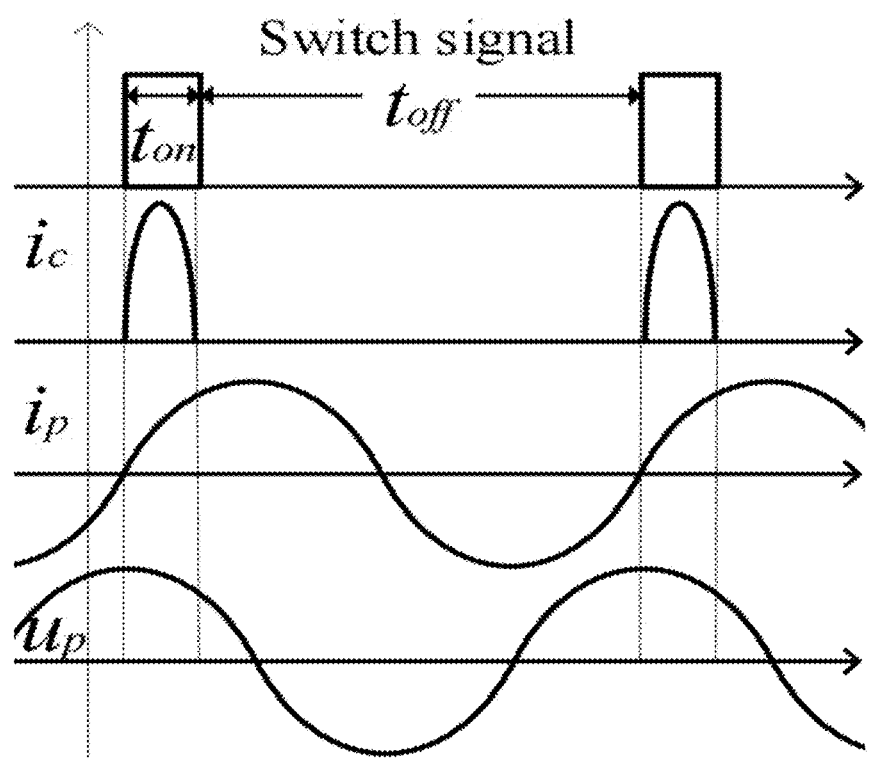
FIG. 5(c) is a waveform diagram illustrating controlling the circuit of FIG. 5(a)

FIG. 5(b) isa block diagram illustrating controlling the circuit of FIG. 5(a). FIG. 5(c) is a waveform diagram illustrating controlling the circuit of FIG. 5(a).

In some embodiments, as shown in FIGS. 5(b) to 5(c), initially, the controller outputs an initial control signal to the control switch K for energizing, the controller obtains the voltage of the first voltage detection terminal through the first detection circuit and determining whether to conduct the control switch K, and in response to determining that a voltage of the first voltage detection terminal reaches a predetermined maximum value, the control switch K is conducted. The controller acquires the energy of the second voltage detection terminal through the second detection circuit and determines whether to disconnect the control switch K. In response to determining that an energy of the second voltage detection terminal reaches a predetermined minimum value, the control switch K is disconnected.

In some embodiments, the present disclosure achieves effective control of the control switch by detecting the voltage of the first voltage detection terminal and the voltage of the second voltage detection terminal, obtaining the optimal charging cycle, and optimizing the operation efficiency of the ZCS.

The embodiments of the present disclosure detect the voltage of the first voltage detection terminal and the energy of the second voltage detection terminal, and adjust the start time and charging cycle until the voltage instantaneous value of the first voltage detection terminal is the largest and the voltage energy of the second voltage detection terminal is the smallest. Since a frequency and waveform of the voltage at the first voltage detection terminal are only determined by a resonance parameter and are not affected by the energy blocking, the start time control is prior to the charging cycle control.

In some embodiments, the first detection circuit utilizes a band-pass filter circuit for voltage detection.

Figure 6:
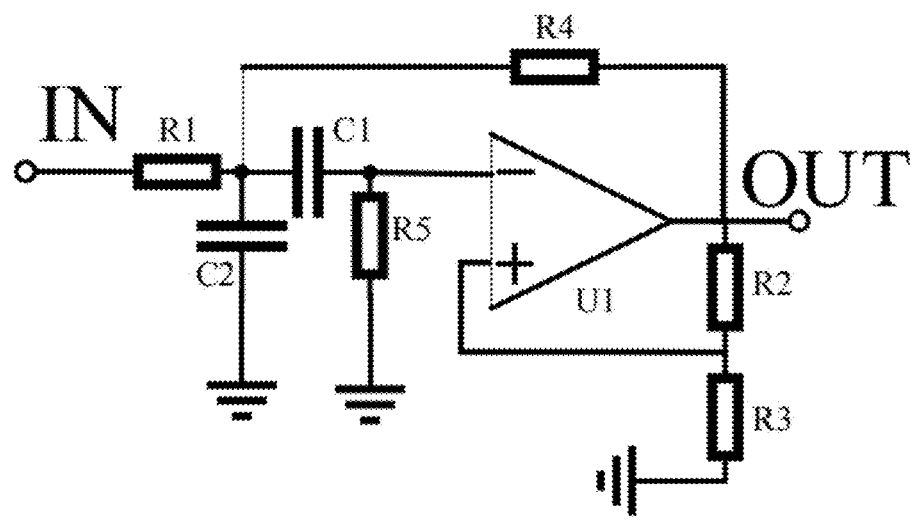
FIG. 6 is a circuit diagram illustrating a first detection circuit according to some embodiments of the present disclosure.

FIG. 6 is a circuit diagram illustrating a first detection circuit according to some embodiments of the present disclosure.

In some embodiments, as shown in FIG. 6, the first detection circuit includes a first operational amplifier U1, a first capacitor C1, a second capacitor C2, a first resistor R1, a second resistor R2, a third resistor R3, a fourth resistor R4, and a fifth resistor R5.

In some embodiments, an inverting input terminal of the first operational amplifier U1 is connected to the input terminal of the first detection circuit via a first capacitor C1 and a first resistor R1, an non-inverting input terminal of the first operational amplifier U1 is connected to an output terminal of the first operational amplifier via a second resistor R2, the output terminal of the first operational amplifier U1 further is grounded via a third resistor R3, and the output terminal of the first operational amplifier U1 is the output terminal of the first detection circuit.

In some embodiments, a common terminal of the first capacitor C1 and the first resistor R1 is connected to the output terminal of the first operational amplifier U1 via a fourth resistor R4, the common terminal of the first capacitor C1 and the first resistor R1 is grounded via a second capacitor C2, and the first capacitor C1 is connected to a common terminal of the first capacitor and the inverting input terminal of the first operational amplifier U1 is grounded via a fifth resistor R5.

In some embodiments of the present disclosure, the first detection circuit realizes a voltage detecting function with high accuracy and stability through the configuration of the first operational amplifier, a capacitor and a resistor. The circuit structure is not only capable of effectively filtering out noise interference, but also responding quickly to changes in the input signals, thereby providing accurate voltage feedback information for the wireless power transmitter system.

In some embodiments, the second detection circuit utilizes a diode energy storage circuit for pulse energy detection.

Figure 7:
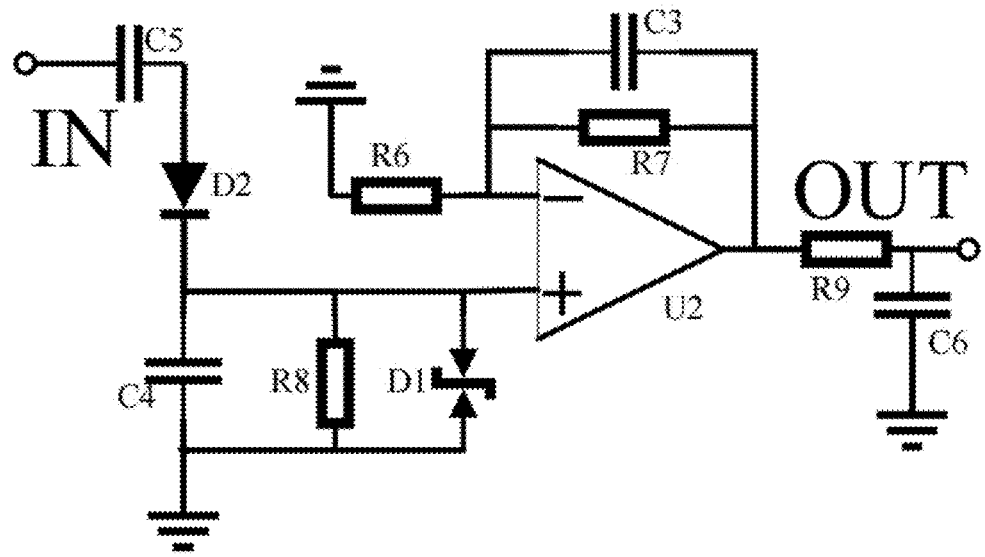
FIG. 7 is a circuit diagram illustrating a second detection circuit according to some embodiments of the present disclosure.

FIG. 7 is a circuit diagram illustrating a second detection circuit according to some embodiments of the present disclosure.

In some embodiments, as shown in FIG. 7, the second detection circuit includes a second operational amplifier U2, a third capacitor C3, a fourth capacitor C4, a fifth capacitor C5, a sixth capacitor C6, a sixth resistor R6, a seventh resistor R7, an eighth resistor R8, a ninth resistor R9, a bidirectional zener diode D1 and a diode D2.

In some embodiments, an inverting input terminal of the second operational amplifier U2 is grounded via a sixth resistor R6, the inverting input terminal of the second operational amplifier U2 is further connected to the output terminal of the second operational amplifier U2 via a seventh resistor R7, the inverting input terminal of the second operational amplifier U2 is further connected to the output terminal of the second operational amplifier U2 via a third capacitor C3, an non-inverting input terminal of the second operational amplifier U2 is grounded via the bidirectional zener diode D1, an eighth resistor R8, and a fourth capacitor C4, the inverting input terminal of the second operational amplifier U2 is further connected to a negative pole of a diode D2, and an output terminal of the second operational amplifier U2 is connected to the output terminal of the second detection circuit via a ninth resistor R9.

In some embodiments, a positive terminal of the diode D2 is connected to the input terminal of the second detection circuit via a fifth capacitor C5, and the output terminal of the second detection circuit is grounded via a sixth capacitor C6.

In some embodiments, the first operational amplifier U1, and the second operational amplifier U2 both utilize operational amplifiers with model number NE5532.

According to some embodiments of the present disclosure, the second detection circuit realizes a highly efficient and accurate pulse energy detection function through the synergistic design of components such as a second operational amplifier, the resistor, the capacitor, and the diode.

In some embodiments, the control switch K utilizes a pair of Metal-Oxide-Semiconductor (MOS) tubes connected in reverse series to exercise a charging and energy blocking function.

In some embodiments, as shown in FIG. 5(a), the control switch K includes a first MOS tube U3 and a second MOS tube U4.

According to some embodiments of the present disclosure, by employing the band-pass filter circuit for voltage detection, the diode energy storage circuit for pulse energy detection and employing a pair of MOS tubes connected in reverse series to exercise the charging and energy blocking function, a detection accuracy, an energy management efficiency, and a switching control flexibility of the wireless power transfer system can be enhanced.

In some embodiments, a gate of the first MOS tube U3 is connected to the controller as a drive terminal, a drain of the first MOS tube U3 is connected to a positive pole of the power supply, and the first MOS tube U3 has a second voltage detection terminal between the drain and the positive pole of the power supply. A gate of the second MOS tube U4 is connected to the controller as the drive terminal, a drain of the second MOS tube U4 is connected to a terminal of the charge-blocking oscillation circuit, and a source of the second MOS tube U4 is connected to a source of the first MOS tube U3.

In some embodiments, there are a plurality of types of the controller. For example, the controller includes a digital signal processor (DSP) of model number TMS320F28335, and the foregoing DSP controller having a main frequency of 150 MHz.

In some embodiments, the first MOS tube U3 and the second MOS tube U4 are selected based on an initial oscillation voltage $U_{P,M}$ at the time of oscillation of the circuit, and a SIC has a 1200V withstand voltage with model number C2M0080120D.

In some embodiments, the first MOS tube U3 and the second MOS tube U4 are N-channel enhancement MOSFETs.

According to some embodiments of the present disclosure, the control switch is designed to achieve an efficient charging and energy blocking function through a combination of the first MOS tube and the second MOS tube.

In some embodiments, as shown in FIG. 5(a), the rectifier at the receiver terminal uses UCC24624 half-bridge rectification scheme of T1, which helps to reduce system losses.

Example 1

The circuitry and control of the wireless power transmitter system are illustrated in FIGS. 5(a) to 7. The parameters of the wireless power transmitter system are shown in Table 2 below:

TABLE 2

Parameters of the wireless power transmitter system

| $L_P$ | $C_P$ | $r_P$ | $L_f$ | $R_L$ |
|---|---|---|---|---|
| 23uH | 47 nF | 0.5 Ω | 1.5uH | 12.5 Ω |
| $L_S$ | $C_S$ | $r_S$ | $U_{out}$ | MOSFET |
| 23uH | 47 nF | 0.5 Ω | 10v | C2M0080120D |

In the Table 2, $r_P$ and $r_s$ are not shown in FIG. 5(a) and the settings of $r_P$ and $r_s$ are consistent with FIG. 2(a) and FIG. 2(b). $U_{out}$ is an output voltage at the receiver terminal. The MOSFET is the first MOS tube U3 and the second MOS tube U4.

The first operational amplifier U1 and the second operational amplifier U2 are both modeled as NE5532 operational amplifiers. The controller is a model TMS320F28335 DSP with a 150 MHz main frequency. The rectifier at the receiver terminal uses the UCC24624 half-bridge rectifier scheme of T1.

The control parameter may be defined as the turn on the charging time $t_{on}$ and the turn off the oscillating time $t_{off}$. The control parameter determines the state of the switching instant of the switching tube, which greatly affects the switching losses. In order to verify the effect of control parameters on the efficiency, the present disclosure also presents experiments on two sets of control parameter system, namely the fixed control parameters ($t_{on}$=2.44 us, $t_{off}$=21.95 us) and the feedback control parameters under the ZCS operation.

Figure 8A:
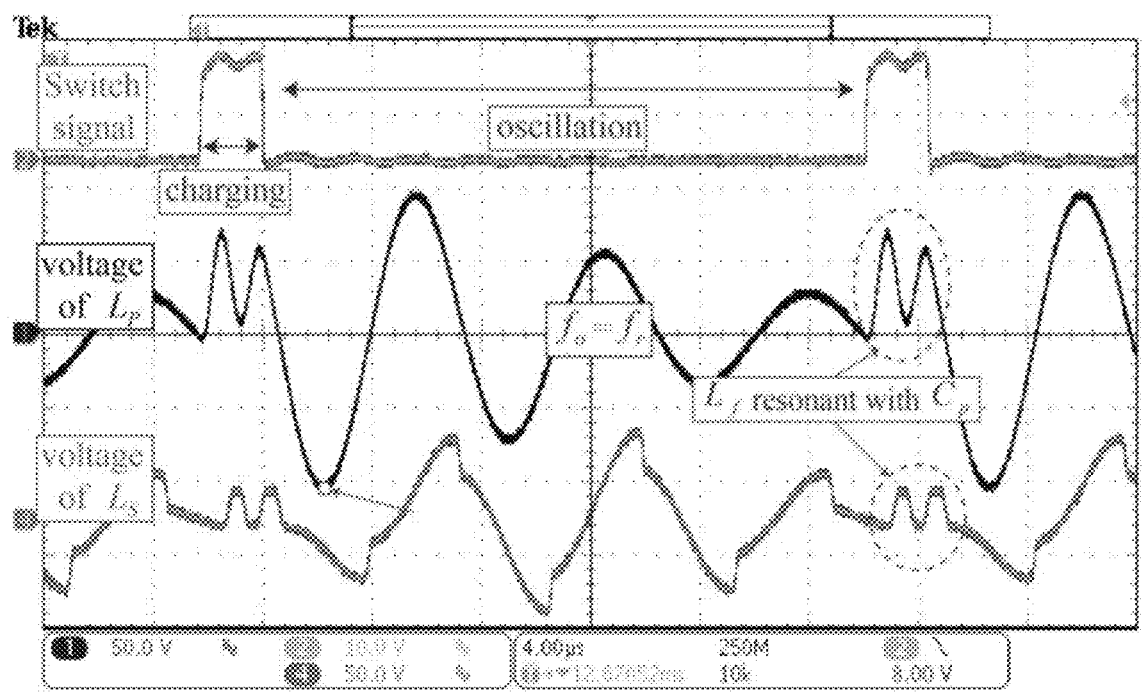
FIG. 8(a) is a waveform diagram illustrating a process of performing an experiment using the circuit of FIG. 5(a) at fixed parameter control.
Figure 8B:
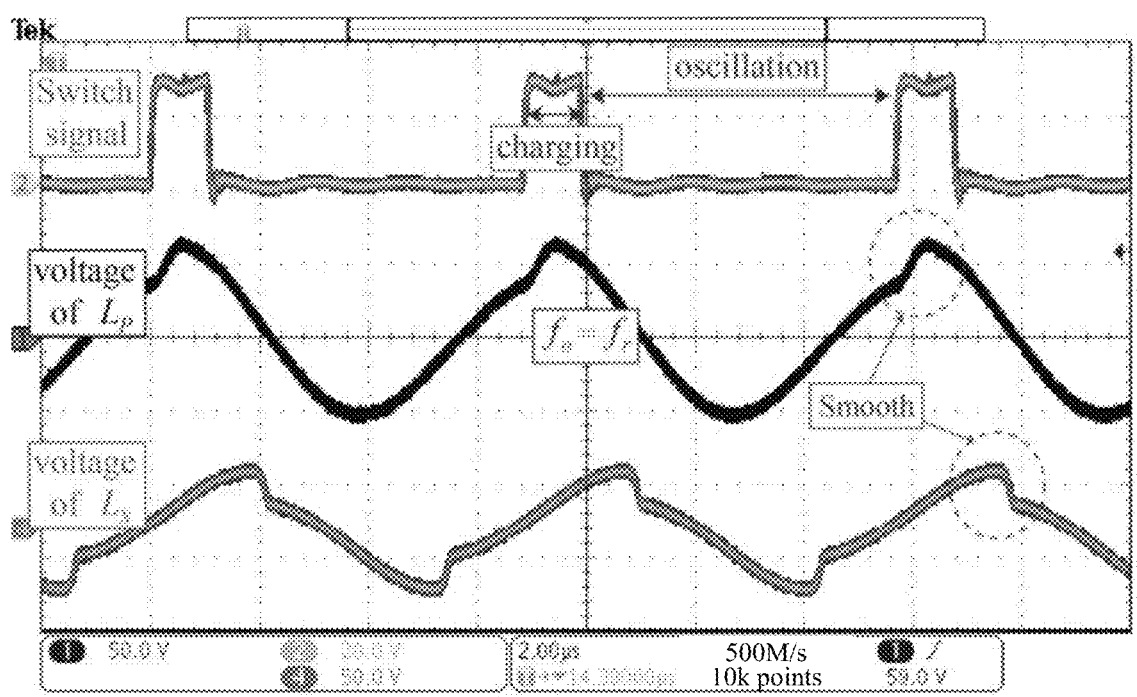
FIG. 8(b) is a waveform diagram illustrating a process of performing an experiment using the circuit of FIG. 5(a) during ZCS control.

FIG. 8(a) is a waveform diagram illustrating a process of performing an experiment using the circuit of FIG. 5(a) at fixed parameter control. FIG. 8(b) is a waveform diagram illustrating a process of performing an experiment using the circuit of FIG. 5(a) during ZCS control.

In some embodiments, FIG. 8(a) and FIG. 8(b) show experimental waveforms under two control systems at a charging distance of 15 mm, the figures shos the switching control signal, a voltage $u_{L_p}$ of the transmitter coil, and a voltage $u_{L_s}$ of the receiver coil, respectively. From the figures, it may be found that the frequency $f_O$ is the same for different parameters, which is 146 KHz and verifies the strong robustness of the present disclosure in achieving resonance operation. The initial oscillation voltage is not very high for the fixed parameter due to the filter capacitor at the output terminal. During the charging time $t_{on}$, the buffer filter inductor resonates with the resonance capacitor, the high frequency oscillation is caused to be transmitted to the receiver coil. For the waveform is controlled by the ZCS, the voltage at the switching transition is very smooth, which is indicative of efficient operation.

Figure 9A:
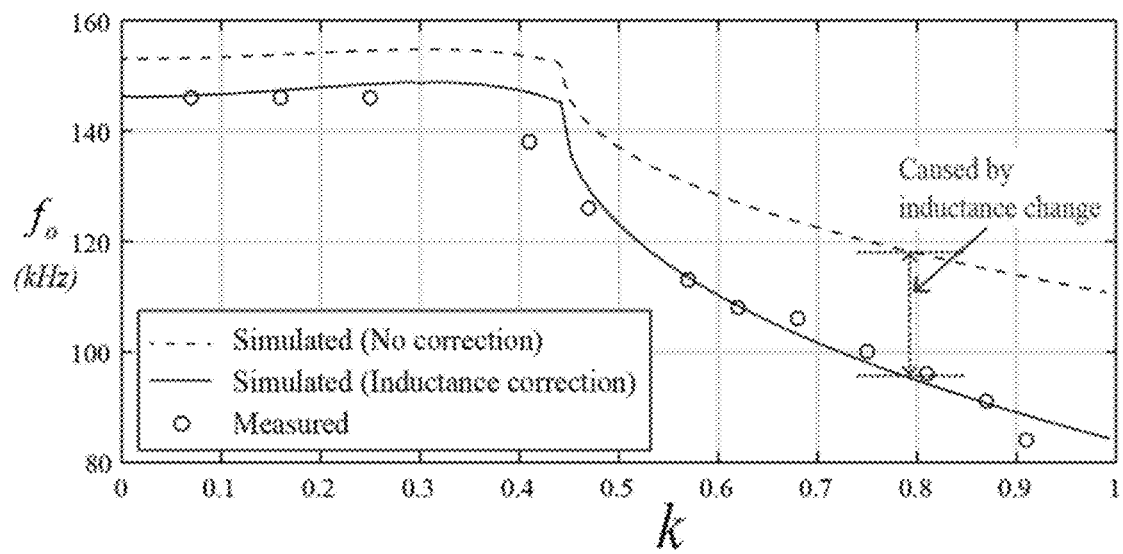
FIG. 9(a) is an oscillation angular frequency diagram illustrating a transmitter coil under different couplings when the circuit of FIG. 5(a) is used for an experiment.

FIG. 9(a) is an oscillation angular frequency diagram illustrating a transmitter coil under different couplings when the circuit of FIG. 5(a) is used for an experiment.

FIG. 9(a) is experimental oscillation frequencies of the wireless power transfer system under different distances, where the fixed control parameter self-oscillating system, the conventional fixed frequency system, and the ZCS-controlled self-oscillating system are tested. Because an inductance value change causes the experimental frequency to be lower than the simulation, the figure also shows the simulation data after adding the inductance value correction. From the figure, it may be seen that the oscillation angular frequency decreases as the coupling becomes larger, which is in line with a law of SS topology resonance frequency operation. At the same time, it is found that there is some deviation of the frequency $f_O$ in strong coupling, and the error with the experimental frequency is about 0.5% after calculation. This is because the $R_O$ becomes larger under strong coupling, which reduces the Q, and the error can be further improved by increasing the Q value.

Figure 9B:
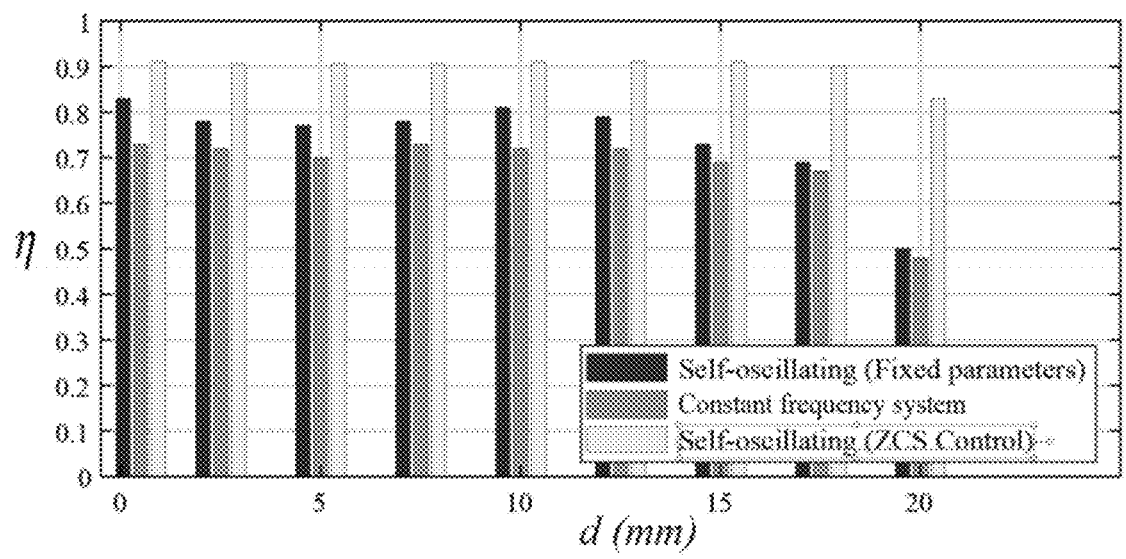
FIG. 9(b) is a system efficiency diagram illustrating a process of performing an experiment using the circuit of FIG. 5(a) at different distances.

FIG. 9(b) is a system efficiency diagram at different spacings when an experiment is performed using a circuit of FIG. 5(a).

FIG. 9(b) shows the experimental efficiency of the wireless power transmitter system at different spacings, where a fixed control parameter self-oscillating system, a conventional fixed-frequency system, and a ZCS-controlled self-oscillating system are tested. For the efficiency test, compared with the conventional fixed-frequency system, the ZCS-controlled self-oscillating system of the present disclosure maintains high efficiency under strong coupling, and the specific ZCS-controlled self-oscillating system is shown in Table 3. The highest efficiency of the WPT in the present disclosure that realizes the self-oscillating by charging the blocking oscillation is more than 90%, which shows that proposing the present disclosure has a good prospect for application implementation.

TABLE 3

Datasheet of parameters related to the ZCS-controlled self-oscillating system

| d (mm) | 0 | 1 | 2 | 3 | 4 | 5 | 6 |
|---|---|---|---|---|---|---|---|
| $t_{on}$ (us) | 2.38 | 1.10 | 1.25 | 1.2 | 1.13 | 1.11 | 1.06 |
| $t_{off}$ (us) | 21.43 | 9.89 | 9.17 | 8.80 | 8.30 | 8.15 | 7.79 |
| d (mm) | 8 | 10 | 12 | 15 | 18 | 20 | d (mm) |
| $t_{on}$ (us) | 0.95 | 0.99 | 1.04 | 1.23 | 0.96 | 0.89 | $t_{on}$ (us) |
| $t_{off}$ (us) | 6.98 | 6.64 | 6.37 | 5.62 | 5.89 | 5.96 | $t_{off}$ (us) |

Example embodiments of the present specification provide a wireless power transfer system for zero current switching (ZCS) operation under charge-blocking oscillation, comprising a power supply, a transmitter terminal and a receiver terminal, the transmitter terminal has a resonance capacitor and a transmitter coil, the receiver terminal has a receiver coil, the receiver coil being coupled with the transmitter coil to produce a magnetic field coupling; wherein the transmitter terminal further comprises: an equivalent resistor, the equivalent resistor being connected in series with the transmitter coil and then in parallel with the resonance capacitor to form a charge-blocking oscillation circuit; a control switch, the control switch being connected with both terminals of the power supply after being connected in series with the charge-blocking oscillation circuit, and the control switch being provided between a positive pole of the power supply and the charge-blocking oscillation circuit; a side of the transmitter coil close to the control switch having a first voltage detection terminal, and a second voltage detection terminal being provided between the control switch and the power supply; in response to determining that a voltage of the first voltage detection terminal reaches a predetermined maximum value, conducting the control switch; and in response to determining that an energy of the second voltage detection terminal reaches a predetermined minimum value, disconnecting the control switch.

In some embodiments, the first detection circuit utilizes a band-pass filter circuit for voltage detection; the second detection circuit utilizes a diode energy storage circuit for pulse energy detection; and/or the control switch utilizes a pair of MOS tubes connected in reverse series to exercise a charging and energy blocking function.

The above detailed description of the present disclosure in conjunction with the embodiments of the accompanying drawings, and a person of ordinary skill in the art may make various variations of the present disclosure in accordance with the above description. Thus, certain details in the embodiments shall not constitute a limitation of the present disclosure, and the present disclosure will take the scope defined by the appended claims as the scope of protection.

What is claimed is:

1. A wireless power transfer system for zero current switching (ZCS) operation under charge-blocking oscillation, comprising a power supply, a transmitter terminal and a receiver terminal, the transmitter terminal having a resonance capacitor and a transmitter coil, the receiver terminal having a receiver coil, the receiver coil being coupled with the transmitter coil to produce a magnetic field coupling;
wherein the transmitter terminal further comprises:
an equivalent resistor, the equivalent resistor being connected in series with the transmitter coil and then in parallel with the resonance capacitor to form a charge-blocking oscillation circuit;
a control switch, the control switch being connected with both terminals of the power supply after being connected in series with the charge-blocking oscillation circuit, and the control switch being provided between a positive pole of the power supply and the charge-blocking oscillation circuit;
a side of the transmitter coil close to the control switch having a first voltage detection terminal, and a second voltage detection terminal being provided between the control switch and the power supply;
in response to determining that a voltage of the first voltage detection terminal reaches a predetermined maximum value, conducting the control switch; and
in response to determining that an energy of the second voltage detection terminal reaches a predetermined minimum value, disconnecting the control switch.

2. The wireless power transfer system for zero current switching (ZCS) operation under charge-blocking oscillation of claim 1, wherein when the control switch is controlled to be conducted, the transmitter terminal is in a charging process and the transmitter terminal is connected with the power supply and energized; and
when the control switch is controlled to be disconnected, the transmitter terminal is in a self-oscillating stage, the transmitter terminal forms a blockage, there is an energy oscillation between the transmitter coil and the resonance capacitor, and the receiver coil at the receiver terminal obtains the energy to realize a wireless power transfer.

3. The wireless power transfer system for zero current switching (ZCS) operation under charge-blocking oscillation of claim 1, wherein the transmitter terminal further includes:
a buffer filter inductor, the buffer filter inductor being connected in series with the charge-blocking oscillation circuit, and the buffer filter inductor being provided between a negative pole of the power supply and the charge-blocking oscillation circuit.

4. The wireless power transfer system for zero current switching (ZCS) operation under charge-blocking oscillation of claim 3, wherein an inductance value of the buffer filter inductor is within a range of 15 nH to 15 uH.

5. The wireless power transfer system for zero current switching (ZCS) operation under charge-blocking oscillation of claim 4, wherein the inductance value of the buffer filter inductor is 1.5 uH.

6. The wireless power transfer system for zero current switching (ZCS) operation under charge-blocking oscillation of claim 1, wherein the wireless power transfer system for ZCS operation under charge-blocking oscillation further includes a control circuit, the control circuit includes:
a controller, the controller being connected to a drive terminal of the control switch;
a first detection circuit, an input terminal of the first detection circuit being connected to the first voltage detection terminal, the first detection circuit being configured to detect the voltage of the first voltage detection terminal, an output terminal of the first detection circuit being connected to a signal input terminal of the controller;
a second detection circuit, an input terminal of the second detection circuit being connected to the second voltage detection terminal, the second detection circuit being configured to detect the energy of the second voltage detection terminal, and an output terminal of the second detection circuit being connected to the signal input terminal of the controller; and
initially, the controller outputting an initial control signal to the control switch for energizing, the controller obtaining the voltage of the first voltage detection terminal through the first detection circuit and determining whether to conduct the control switch, and the controller obtaining the energy of the second voltage detection terminal through the second detection circuit and determining whether to disconnect the control switch.

7. The wireless power transfer system for zero current switching (ZCS) operation under charge-blocking oscillation of claim 6, wherein the first detection circuit utilizes a band-pass filter circuit for voltage detection;
the second detection circuit utilizes a diode energy storage circuit for pulse energy detection; and/or
the control switch utilizes a pair of Metal-Oxide-Semiconductor (MOS) tubes connected in reverse series to exercise a charging and energy blocking function.

8. The wireless power transfer system for zero current switching (ZCS) operation under charge-blocking oscillation of claim 6, wherein the first detection circuit includes:
a first operational amplifier, an inverting input terminal of the first operational amplifier being connected to the input terminal of the first detection circuit via a first capacitor and a first resistor, an non-inverting input terminal of the first operational amplifier being connected to an output terminal of the first operational amplifier via a second resistor, the output terminal of the first operational amplifier further being grounded via a third resistor, and the output terminal of the first operational amplifier being the output terminal of the first detection circuit;

a common terminal of the first capacitor and the first resistor being connected to the output terminal of the first operational amplifier via a fourth resistor, the common terminal of the first capacitor and the first resistor being grounded via a second capacitor, and the first capacitor being connected to a common terminal of the first capacitor and the inverting input terminal of the first operational amplifier being grounded via a fifth resistor.

9. The wireless power transfer system for zero current switching (ZCS) operation under charge-blocking oscillation of claim 6, wherein the second detection circuit includes:

a second operational amplifier, an inverting input terminal of the second operational amplifier being grounded via a sixth resistor, the inverting input terminal of the second operational amplifier being further connected to the output terminal of the second operational amplifier via a seventh resistor, the inverting input terminal of the second operational amplifier being further connected to the output terminal of the second operational amplifier via a third capacitor, an non-inverting input terminal of the second operational amplifier being grounded via a bidirectional zener diode, an eighth resistor, and a fourth capacitor, the inverting input terminal of the second operational amplifier being further connected to a negative pole of a diode, and an output terminal of the second operational amplifier being connected to the output terminal of the second detection circuit via a ninth resistor; and a positive terminal of the diode being connected to the input terminal of the second detection circuit via a fifth capacitor, and the output terminal of the second detection circuit being grounded via a sixth capacitor.

10. The wireless power transfer system for zero current switching (ZCS) operation under charge-blocking oscillation of claim 6, wherein the control switch includes:

a first MOS tube, a gate of the first MOS tube being connected to the controller as a drive terminal, and a drain of the first MOS tube being connected to a positive pole of the power supply; and a second MOS tube, a gate of the second MOS tube being connected to the controller as the drive terminal, a drain of the second MOS tube being connected to a terminal of the charging blocking oscillation circuit, and a source of the second MOS tube being connected to a source of the first MOS tube.

* * * * *